(12) United States Patent
Pflug

(10) Patent No.: US 11,192,316 B2
(45) Date of Patent: Dec. 7, 2021

(54) HIERARCHICAL HONEYCOMB CORE WITH SANDWICH CELL WALLS

(71) Applicant: ECONCORE N.V., Leuven (BE)

(72) Inventor: Jochen Pflug, Wiesbaden (DE)

(73) Assignee: ECONCORE N.V., Heverlee (BE)

( * ) Notice: Subject to any disclaimer, the term of this patent is extended or adjusted under 35 U.S.C. 154(b) by 0 days.

(21) Appl. No.: 16/968,900

(22) PCT Filed: Feb. 18, 2019

(86) PCT No.: PCT/EP2019/053930
§ 371 (c)(1),
(2) Date: Aug. 11, 2020

(87) PCT Pub. No.: WO2019/158743
PCT Pub. Date: Aug. 22, 2019

(65) Prior Publication Data
US 2021/0046719 A1     Feb. 18, 2021

(30) Foreign Application Priority Data
Feb. 16, 2018   (EP) ...................................... 18157288

(51) Int. Cl.
*B29D 24/00*       (2006.01)
*B29D 99/00*       (2010.01)
(Continued)

(52) U.S. Cl.
CPC ....... *B29D 24/005* (2013.01); *B29D 99/0089* (2013.01); *B32B 3/28* (2013.01); *B32B 27/06* (2013.01); *B29K 2701/12* (2013.01)

(58) Field of Classification Search
None
See application file for complete search history.

(56) References Cited

U.S. PATENT DOCUMENTS

| | | | | |
|---|---|---|---|---|
| 6,800,351 B1 * | 10/2004 | Pflug | ...................... | B31D 3/005 |
| | | | | 156/166 |
| 10,443,496 B2 * | 10/2019 | Herrera | ................... | B32B 5/024 |

FOREIGN PATENT DOCUMENTS

| | | |
|---|---|---|
| EP | 1824667 B1 | 7/2010 |
| WO | 2016184528 A1 | 11/2016 |

OTHER PUBLICATIONS

International Search Report and Written Opinion in corresponding PCT/EP2019/053930 dated May 31, 2019, 11 pages total.
(Continued)

*Primary Examiner* — Linda L Gray
(74) *Attorney, Agent, or Firm* — Hamre, Schumann, Mueller & Larson, P.C.

(57) ABSTRACT

A hierarchical sandwich core and a method of making it where a macroscopic honeycomb with a first macroscopic cell with first sandwich cell walls is connected to neighbouring macroscopic cells with neighbouring sandwich cell walls. The first and neighbouring sandwich cell walls are made of a sandwich material having a width, a mesoscopic core, and a first skin layer on a first major surface and a second skin layer on a second major surface of the sandwich material, both skin layers being attached to the mesoscopic core forming each sandwich cell wall of the macroscopic honeycomb. The first and the neighbouring cell walls have a height determined by the width of the sandwich material, both skin layers of the first sandwich cell wall being connected to both skin layers of at least one neighbouring cell wall along the height of the first cell wall.

16 Claims, 17 Drawing Sheets

(51) Int. Cl.
  *B32B 3/00*      (2006.01)
  *B32B 27/00*     (2006.01)
  *B32B 3/28*      (2006.01)
  *B32B 27/06*     (2006.01)
  *B29K 701/12*    (2006.01)

(56) References Cited

OTHER PUBLICATIONS

Second Written Opinion in corresponding PCT/EP2019/053930 dated Jan. 16, 2020, 6 pages total.
International Preliminary Report on Patentability in corresponding PCT/EP2019/053930 dated Jun. 16, 2020, 19 pages total.
European Search Report in corresponding European Application No. 18157288.4, dated Aug. 24, 2018, 8 pages total.

* cited by examiner

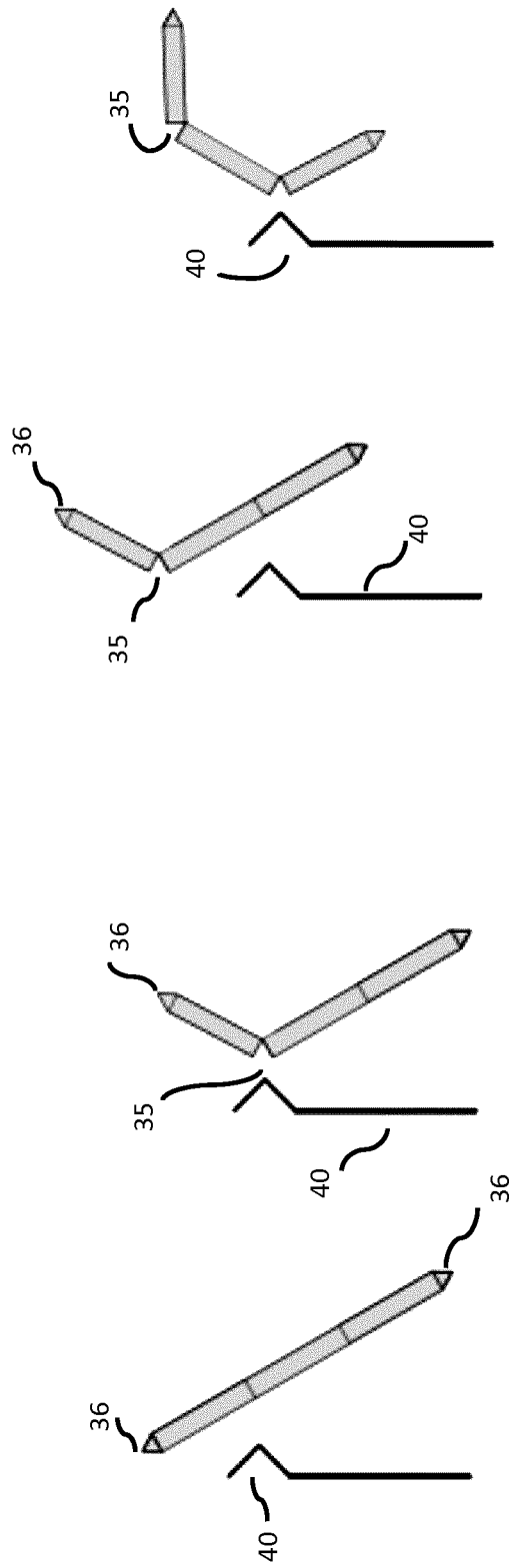
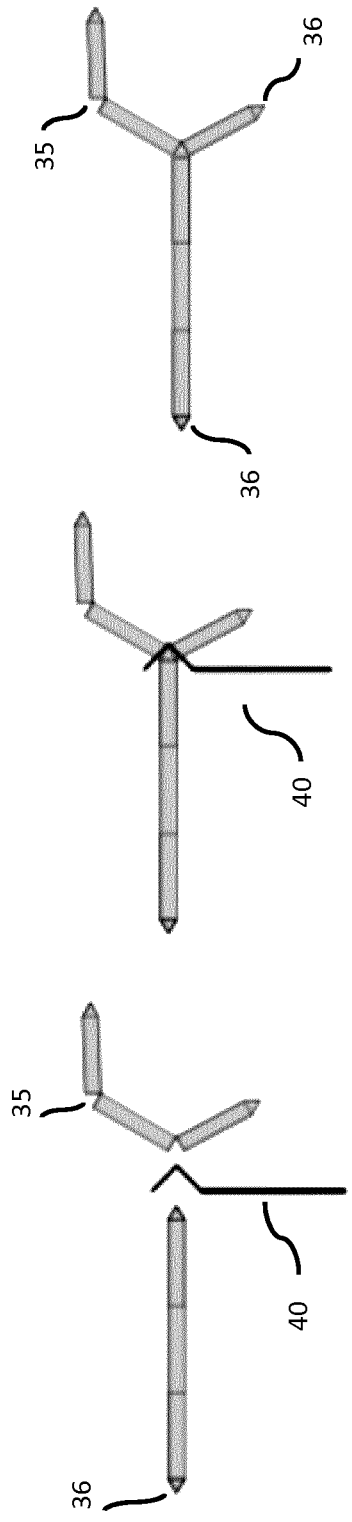
Figure 5 A
Figure 5 B
Figure 6 A
Figure 6 B
Figure 7 A
Figure 7 B
Figure 7 C

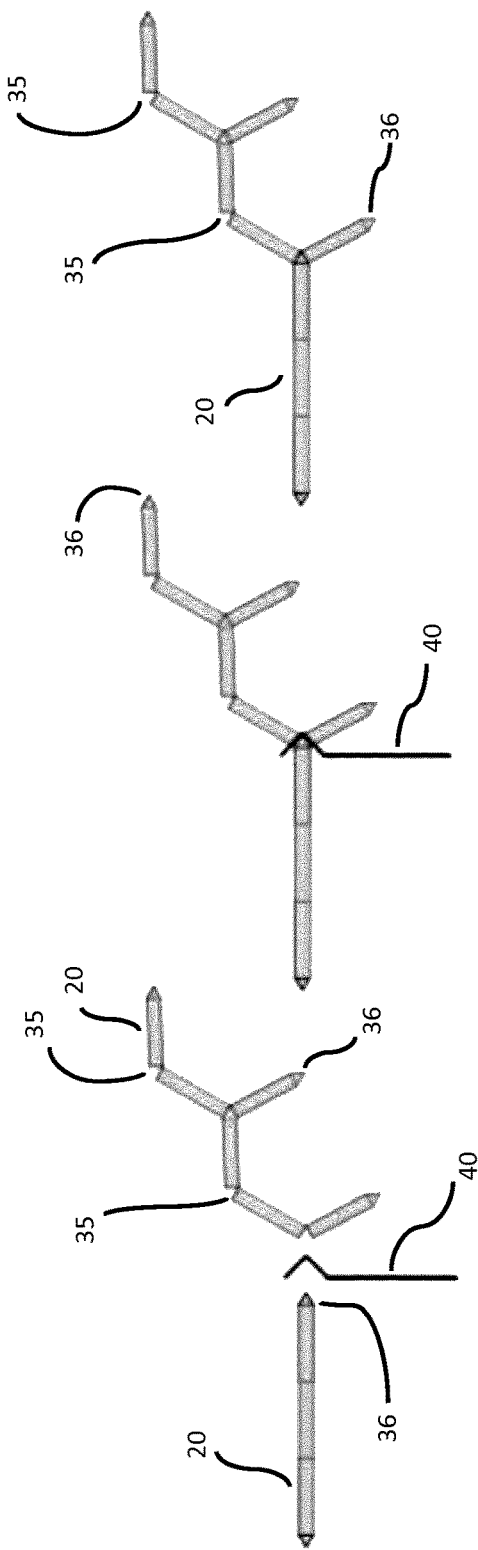
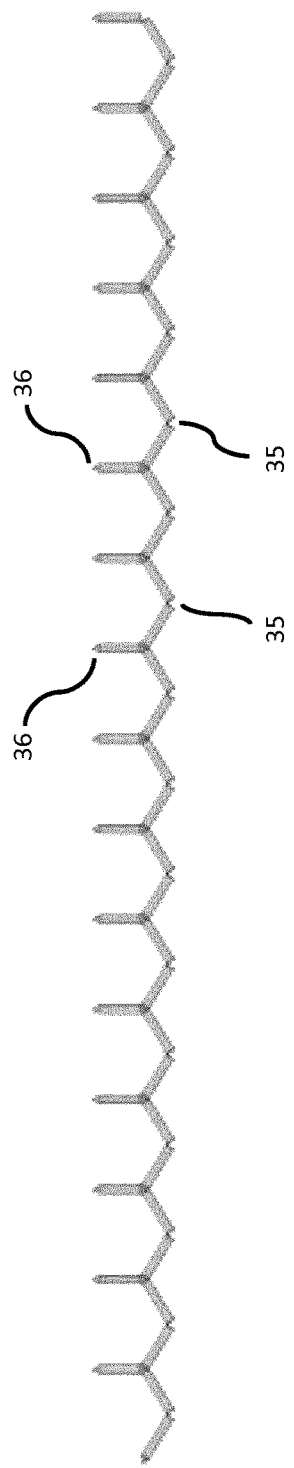
Figure 8 A  Figure 8 B  Figure 8 C
Figure 9 A

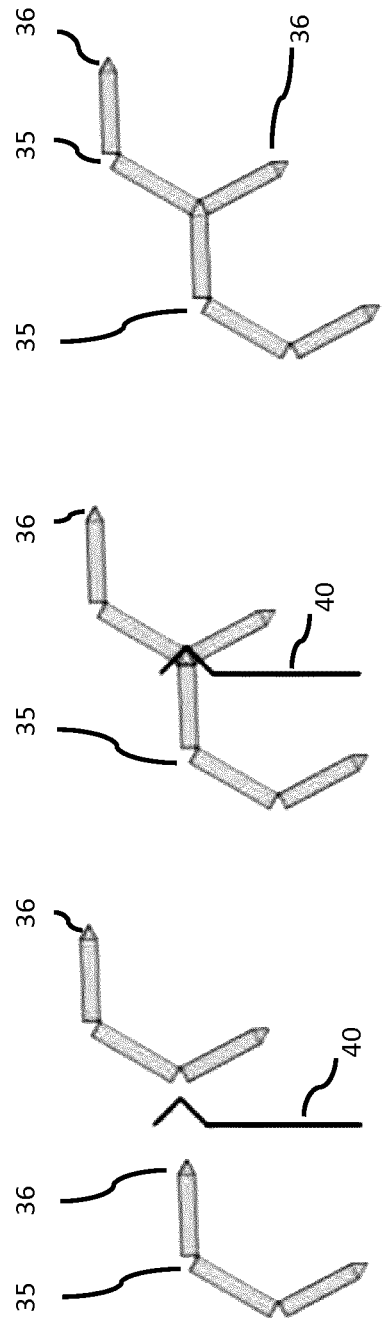
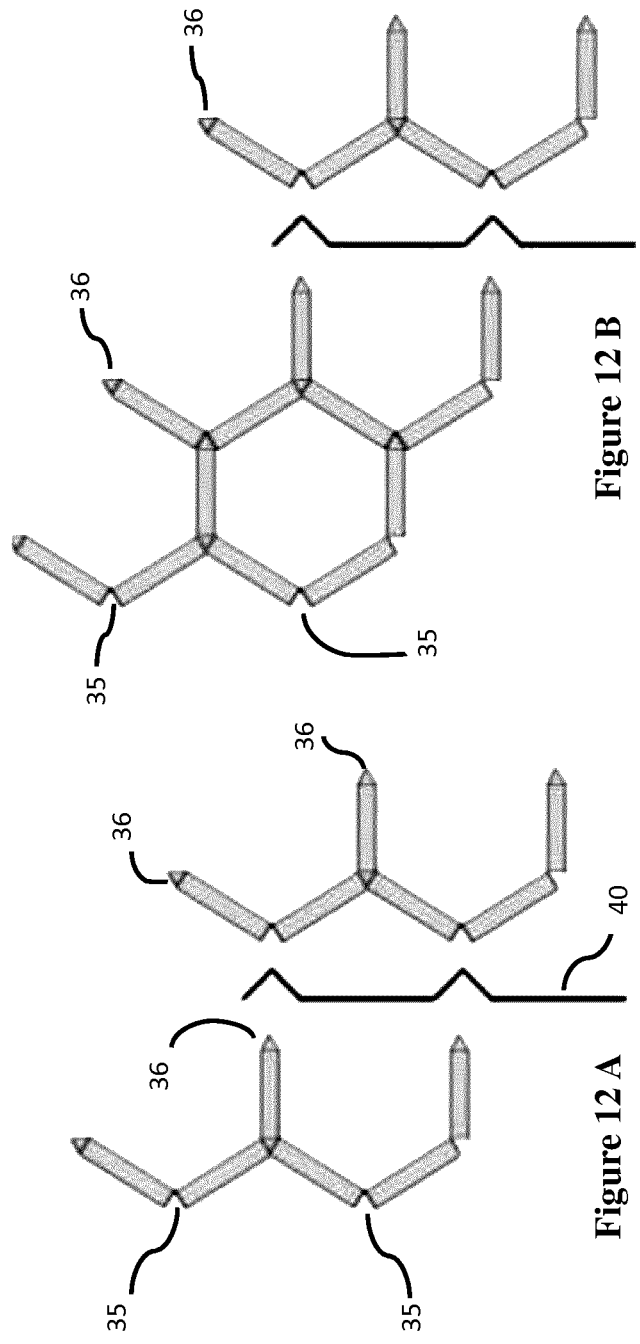

HIERARCHICAL HONEYCOMB CORE WITH SANDWICH CELL WALLS

The present invention relates to hierarchical honeycomb cores made from sandwich materials and methods of making hierarchical honeycomb cores from sandwich materials that include honeycomb cores or cellular structures similar to honeycomb cores. Such hierarchical honeycomb cores can be used to make sandwich panel for many different applications such as those requiring high bending stiffness and strength at minimal weight. These can be used for example in aerospace, automotive, transportation, building and other applications.

BACKGROUND

A core being sandwiched between two thin facing sheets or skins is frequently used to produce stiff and lightweight panels. Homogeneous cores (e.g. foam cores) and structured cores (e.g. honeycomb cores or periodic lattice materials) are two broad classes of core materials which can be employed in sandwich construction.

Foams can be closed or open cell. Foams possess limited specific stiffness and strength in each direction. In contrast, honeycomb materials have better specific stiffness and strength in out-of-plane direction.

Hexagonal honeycombs are extensively used in sandwich constructions due to their high specific stiffness and strength in out-of-plane compression and in out-of-plane shear performance. However, honeycomb cores with a very low density need to have very thin cell walls. These thin cell walls tend to buckle under the out-of-plane compression and shear loads so that a small cell size is required, but a smaller cell size leads to higher density and weight.

Furthermore, honeycomb cores can be limited in size due to limitations in the size of the production equipment. Continuous production processes have been developed to enable a cost efficient production of honeycomb cores with variable length. For a larger width higher investments have to be considered or core sheets have to be combined together.

Expansion processes are known with which the final honeycomb geometry is obtained by pulling the collapsed structure laterally, e.g. expandable aluminium honeycombs. The nodes of the structure of expandable honeycombs allow rotation of the strips which form the cell walls so that an expanded honeycomb can be flattened. To stabilize aramid paper based expanded honeycombs are dipped into resin which is cured while the honeycomb is hold in the expanded shape. Thermoplastic expanded honeycombs have to be heat treated to relax the stresses imposed by the expansion process.

To reach lower honeycomb densities the material of the cell walls needs to have a lower density. In an earlier application the inventor proposed a honeycomb core with hierarchical cellular structure having a double sandwich cell wall [see PCT/EP2015/061299].

An advantage of such hierarchical sandwich honeycomb cores is that the outer skins of the sandwich cell walls of a macroscopic honeycomb core transfer the load while the mesoscopic core in the sandwich cell walls supports the skins to prevent them from buckling under shear and compression loads. This allows to use in the cell wall skins a higher performing material (e.g. carbon fibre reinforced layers) and in the core in the cell walls a lower density and a lower cost material (e.g. a continuously produced honeycomb from a thermoplastic polymer, as proposed in EP1824667B1). However, the cell wall skins, which are loaded in-plane when the macroscopic honeycomb is loaded in out-of-plane compression or shear, should preferably transfer loads to neighbouring cell wall skins so that the sandwich cell walls support each other. The slotted or bonded connections with double sandwich cell walls in the earlier proposed hierarchical sandwich honeycombs do not enable an optimal load transfer.

WO2016184528 discloses a hierarchical sandwich core in the form of a honeycomb, i.e. having repetitive and periodic lattice materials. The sandwich core can be made up of a macroscopic honeycomb structure with sandwich cell walls having a mesoscopic cellular core. The longitudinal axis of cells of the mesoscopic honeycomb cell can be perpendicular to the longitudinal axis of the cells of the macroscopic honeycomb structure. Alternatively, if a foam core is used having mesoscopic cells the shape of the mesoscopic cells can be made during the foaming process so that they are elongate in a direction perpendicular to the longitudinal axis of the cells of the macroscopic honeycomb structure. Connections between layers of material are not able to support tensile, compressive or shear forces.

SUMMARY OF THE INVENTION

It is the object of the present invention to provide a product design and a production method which allows cellular structures (e.g. comprising honeycomb cells) to have a lower density due to lower density sandwich cell walls with an optimal load transfer between the sandwich cell walls. An advantage of embodiments of the present invention is the production of large honeycomb sheet sizes using an economical process and efficient equipment.

In one aspect a hierarchical sandwich core is provided in the form of a macroscopic honeycomb with a first macroscopic cell with first sandwich cell walls connected to neighbouring macroscopic cells with neighbouring sandwich cell walls, the first and neighbouring sandwich cell walls being made of a sandwich material having a width, a mesoscopic core, and a first skin layer on a first major surface and a second skin layer on a second major surface of the sandwich material, both skin layers being attached to the mesoscopic core forming each sandwich cell wall of the macroscopic honeycomb, the first and the neighbouring cell walls having a height determined by the width of the sandwich material, both skin layers of the first sandwich cell wall being connected to both skin layers of at least one neighbouring cell wall along the height of the first cell wall. This has the advantage that only single thickness walls are used which lowers weight and material use whereas the linking through of the skins between cell walls provides very good mechanical strength.

The first and neighbouring macroscopic cell walls can be formed with sandwich material in the form of a multiple arm structure with the multiple arms radiating from a centre where ends of the multiple arms are connected together. The use of multiple arms allows different types of honeycombs to be produced. For example, the multiple arms can be three, four or six arms and the macroscopic sandwich core can have cells with three, four or six cell walls. The macroscopic honeycomb structure can have cell walls in the form of a triangle, a rectangle or a hexagon.

The mesoscopic core can be a mesoscopic honeycomb or is made of a foam or is made from periodic lattice materials or is made from periodic lattice materials filled with foam. This allows different strengths and weights.

A thickness of the sandwich material is preferably smaller than ⅕ of the size of the macroscopic cells. This results in a low weight product.

A chain of at least first and second elements of sandwich material and an opening between the at least first and second elements can be formed, the at least first and second elements being joined by a hinge formed by a foil. As the elements are joined together, they can be manipulated as one item. The third element of sandwich material is then connected in the opening between the first and second elements to form a three arm structure with the three arms radiating and diverging from a centre. The rows of connected three arm structures form a macroscopic honeycomb structure.

Preferably, the opening has a first V shape, an end of the third element having a second V shape, the second V shape is connected in the first V shape. This can provide a good mechanical connection.

The mesoscopic core has cells and the longitudinal axes of the cells of the mesoscopic core are preferably right angles to the longitudinal axes of the cells of the macroscopic honeycomb structure. This has a significant effect upon the strength of the final product.

The cell walls of the macroscopic honeycomb core and/or cell walls of the mesoscopic core can comprise a thermoplastic foil, a laminate of similar or differing materials, a foil having a fibrous content, a fibre reinforced polymer composite, a foil made of a polyolefin, polyethylene or polypropylene or polyamine, polycarbonate, polyethylene terephthalate, polyphenylene sulfide, polyethylenimine or other thermoplastic polymers either alone or in mixtures. These various films and foils demonstrate the flexibility to make products with different characteristics using different materials with the same basic design.

The mesoscopic core can be a corrugated core or extruded twin sheet core, which can be economical to manufacture.

The core and the skin layers of the cell walls can be made integrally. This increases mechanical strength. For example, the core and the skin layers of the cell walls can be formed by extruding or co-extruding a twin sheet with an integral foam sandwich sheet.

In another aspect embodiments of the present invention provide a process of making a hierarchical sandwich core in the form of a macroscopic honeycomb with macroscopic cells and macroscopic cell walls made of a sandwich material having a mesoscopic core, the sandwich material having a first skin layer on a first major surface and a second skin layer on a second major surface, both skin layers of each sandwich material forming a cell wall of the macroscopic honeycomb being connected to both skin layers of at least one neighbouring cell wall, the method comprising:

connecting pieces of sandwich material to make a connection unit having a centre and at least three arms diverging and radiating from the centre, in the centre both skin layers of each arm being connected to both skin layers of at least one neighbouring arm of the connection unit; joining a first connection unit to a second connection unit by connections in which both skin layers of an arm of the first connection unit being connected to both skin layers of at least one neighbouring arm of the second connection unit and repeating the joining step to form a row of connected connection units; and repeatedly connecting rows of connection units to form a macroscopic honeycomb structure with the macroscopic cell walls made of the sandwich material.

The at least three arms can comprise three, four or six arms and the macroscopic sandwich core can have cells with three, four or six cell walls, the macroscopic honeycomb structure can be formed with cell walls in the form of a triangle, a rectangle or a hexagon.

The process can include forming the mesoscopic core from a mesoscopic honeycomb or from a foam or is made from periodic lattice materials or is made from periodic lattice materials filled with foam. A thickness of the sandwich material can be smaller than ⅕ of the size of the macroscopic cells.

The process can comprise forming a chain of at least first and second elements of sandwich material and an opening between the at least first and second elements, joining the at least first and second elements by a hinge formed by a foil; and connecting a third element of sandwich material in the opening between the first and second elements to form a three arm structure with the three arms radiating and diverging from the centre. The rows of connected three arm structures can form a macroscopic honeycomb structure.

The opening can be formed with a first V shape, and an end of the third element can be formed with a second V shape, further comprising connecting the second V shape in the first V shape.

The mesoscopic core cells can be formed with longitudinal axes of the cells of the mesoscopic core being right angles to the longitudinal axes of the cells of the macroscopic honeycomb structure.

The cell walls of the macroscopic honeycomb core and/or cell walls of the mesoscopic core can be formed with a thermoplastic foil, a laminate of similar or differing materials, a foil having a fibrous content, a fibre reinforced polymer composite, a foil made of a polyolefin, polyethylene or polypropylene or polyamine, polycarbonate, polyethylene terephthalate, polyphenylene sulfide, polyethylenimine or other thermoplastic polymers either alone or in mixtures.

In another aspect the present invention provides an apparatus for making a hierarchical sandwich core in the form of a macroscopic honeycomb with macroscopic cells and macroscopic cell walls made of a sandwich material having a mesoscopic core, the sandwich material having a first skin layer on a first major surface and a second skin layer on a second major surface, both skin layers of each sandwich material forming a cell wall of the macroscopic honeycomb being connected to both skin layers of at least one neighbouring cell wall, the apparatus comprising:

Means for connecting pieces of sandwich material to make a connection unit having a centre and at least three arms diverging and radiating from the centre, in the centre both skin layers of each arm being connected to both skin layers of at least one neighbouring arm of the connection unit;

means for joining a first connection unit to a second connection unit by connections in which both skin layers of an arm of the first connection unit being connected to both skin layers of at least one neighbouring arm of the second connection unit;

means for repeating the joining step to form a row of connected connection units; and means for repeatedly connecting rows of connection units to form a macroscopic honeycomb structure with the macroscopic cell walls made of the sandwich material.

In any of the embodiments a connection can transfer tension forces, compression or shear forces across the connection. For example, a form fit connection without a specific bonding but with a form fitting connection can also be adapted to transfer tension. As a further example, connections of layers such as skin layers can be connected by fusion bonding such welding or can be joined by an adhesive or glue. The means of connection, i.e. welding or gluing, can, as an option, be continuous from top to bottom of the cell walls of the macroscopic cells. However a bond along less than the complete height can also be made. The connection can be discontinuous but a single point connection would be less preferred or preferably should even be avoided.

BRIEF DESCRIPTION OF THE DRAWINGS

In FIG. 4A outer skin layers on a sandwich material 20 s are brought to an edge e.g. forced to together and connected.

FIGS. 5A and 5B, FIGS. 6A and 6B, FIGS. 7A to C, FIGS. 8A to C, FIGS. 9A to D, FIGS. 10A and 10B, FIGS. 11A to C, and FIGS. 12A and 12B show embodiments of the present invention using repetition of a three arm motif.

DEFINITIONS

A "hierarchical sandwich core" has cell walls having a first size of cells which are put together to form a large honeycomb core having large cells. Any of the embodiments of the present invention can be used to make a multilevel hierarchical sandwich honeycomb using a hierarchical sandwich honeycomb as a core in the cell walls.

"Macroscopic cells" are the cells of the hierarchical honeycomb having a diameter of the cells of 5 mm to 50 mm or more.

"Mesoscopic cells" are the cells in the sandwich cell walls having a diameter if 0.5 mm to 5 mm.

In any of the embodiments of the present invention a "mesoscopic core" can have a foam core or a periodic lattice core or can be a mesoscopic core in which the cell walls are made of a corrugated core and that the core and the skin of the cell walls can be integrally made e.g. between an extruded twin sheet or an integral foam sandwich sheet with rigid skins and a foamed core, e.g. made by co-extrusion.

In any of the embodiments of the present invention a "macroscopic core" can have empty cells or a foam filling of the cells. The cells of the macroscopic core can have a functional filling, e.g. to store heat energy optionally by phase change materials or the cells may be integrated with a battery in structural sandwich components such as a structural hybrid energy storage.

"Longitudinal axis" of cells means the central axis of a cell that extends parallel to the walls. A cell generally has two distal open ends defined by the walls of the cell. The longitudinal axis notionally exits each cell at the centre of the openings.

The term "fusion bonded" refers to connections made by welding, brazing, soldering etc. where a material is melted or fused in creating the connection.

The term "adhesive bonded" "or adhered" refers to a connection made by use of an adhesive, a glue or similar.

Figure 1:
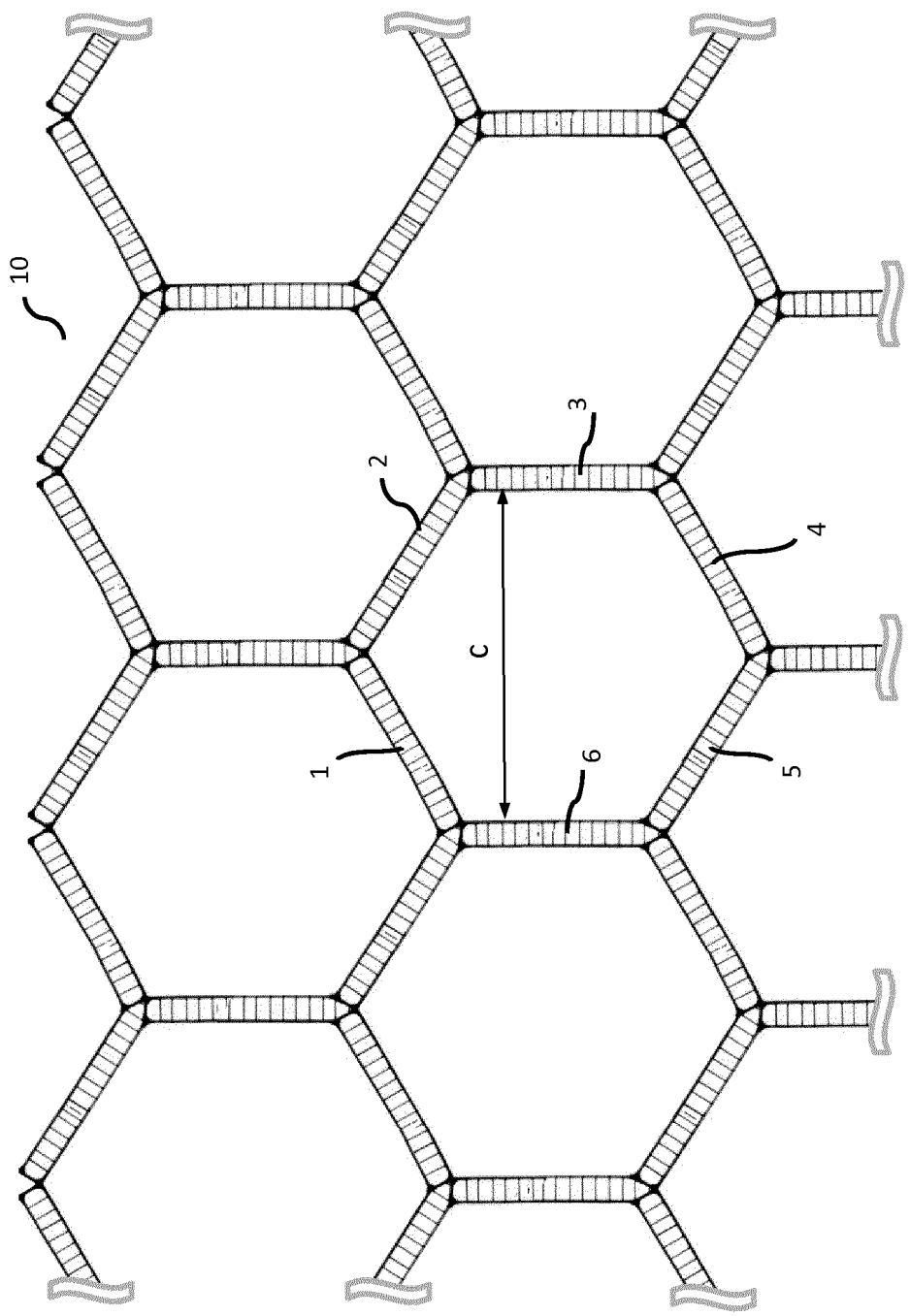
FIG. 1 shows a hexagonal honeycomb as can be produced by embodiments of the present invention.

The "cell size" or "cell diameter" of a honeycomb cell is the distance between two opposing cell walls of a cell—see FIG. 1.

"Connection" between materials such as layers or sheets: a connection can transfer tension forces, compression or shear forces across the connection. For example, a form fit connection without a specific bonding but with a form fitting connection can also be adapted to transfer tension. As a further example, connections of layers such as skin layers can be connected by fusion bonding such welding or can be joined by an adhesive or glue. The means of connection, i.e. welding or gluing, can, as an option, be continuous from top to bottom of the cell walls of the macroscopic cells. However, a bond along less than the complete height can also be made. The bond can be discontinuous but single point connection would be less preferred or should preferably even be avoided.

DETAILED DESCRIPTION OF THE ILLUSTRATIVE EMBODIMENTS INVENTION

The present invention will be described with reference to certain embodiments and with reference to certain drawings. The drawings are not necessarily to scale but are schematic and are not limiting. The invention is defined more generally in the appended claims. Each dependent claim represents a further embodiment of the present invention.

The present invention relates to articles, comprising a hierarchical sandwich core having macroscopic honeycomb cells whose cell walls are made of a sandwich material. The sandwich material has a mesoscopic cellular core and outer skin layers. In embodiments of the present invention the outer skin layers are fusion bonded or adhesive bonded to the mesoscopic cellular core to form a sandwich cell wall. In some embodiments, the mesoscopic cellular structure of the cell walls is made of foam or honeycomb cells. The longitudinal axis of the mesoscopic honeycomb cells or elongate foam cells is preferably perpendicular to the longitudinal axis of the macroscopic honeycomb cells in the assembled hierarchical sandwich core. In embodiments of the present invention, the cell walls made of sandwich material are joined to each other in the form of a repetitive multi-arm such as three arm or four arm or six arm structure, these having arms such as three, four or six radiating and diverging arms joined at the centre such as T- or Y- or X- or snow flake structures. Each of the arms such as three or four or six arms forms a single sandwich cell wall of the cells of the macroscopic honeycomb core. The arms do not produce cell walls with a double sandwich material thickness. The junctions between cell walls are formed as connections of a macroscopic honeycomb cell, and the connections can be permanent joints such that collapse of the macroscopic honeycomb cells laterally can only happen with destruction or distortion of a cell wall. The junctions between cell walls are joined permanently such as by fusion bonding or by adhesive bonding.

Hierarchical sandwich core can be made in the form of a macroscopic honeycomb having macroscopic cells with sandwich cell walls connected to neighbouring macroscopic cells with neighbouring sandwich cell walls, the sandwich cell walls being made of a sandwich material having a width, a mesoscopic core, and a first skin layer on a first major surface and a second skin layer on a second major surface of the sandwich material.

Both skin layers are attached to the mesoscopic core which combination layer forms the sandwich cell walls of the macroscopic honeycomb, the cell walls having a height determined by the width of the sandwich material.

Both skin layers are attached to the mesoscopic core thus forming the sandwich material of a cell wall of the macroscopic honeycomb. Any suitable means can be used to attach both skin layers such as welding, laminating, adhering, soldering etc. Both skin layers of the sandwich cell wall are connected to both skin layers of at least one neighbouring cell wall of the macroscopic cells. Such a connection can transfer tension forces across the connection as well as shear forces or compressive forces. For example, a form fit connection without a specific bonding but with a form fitting connection can also be adapted to transfer tension. As a further example, connections of layers such as skin layers can be connected by welding or gluing. The means of connection, i.e. welding or gluing, can, as an option, be continuous from top to bottom of the cell walls of the macroscopic cells. So a connection can be formed optionally all along the height of the sandwich cell wall, i.e. from top to bottom thereof thus forming an edge connection. The connection does not need to run from top to bottom but can be formed over only a part of the height. The connection can be discontinuous but the connection should not be a point connection.

Figure 13:
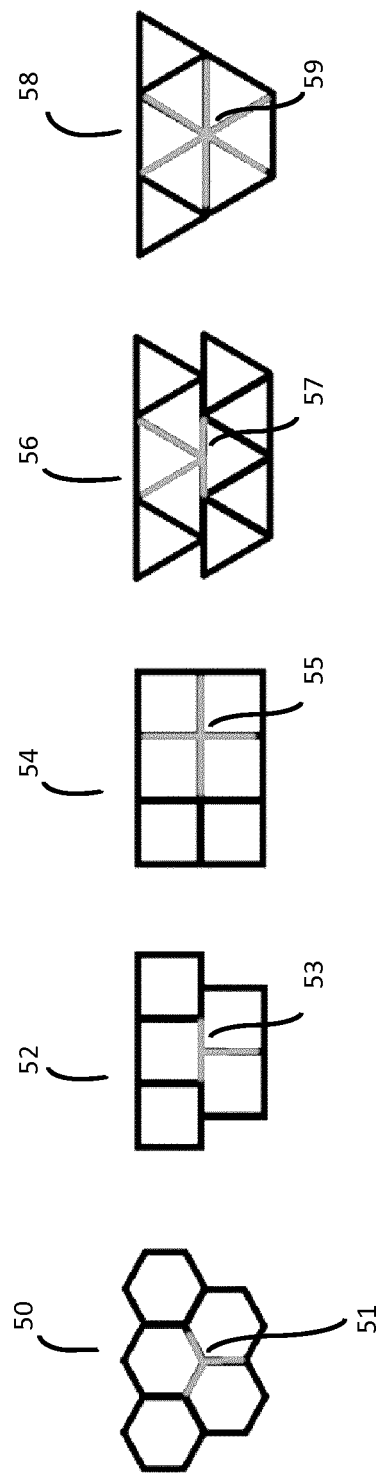
FIG. 13 shows different types of macroscopic honeycombs that can be made with embodiments of the present invention.

Referring to FIG. 1, the present invention relates to a hierarchical (mesoscopic/macroscopic) sandwich core 10 in the form of a macroscopic honeycomb core, e.g. with cells having three, four or six cell walls 1-6, the cell walls 1-6 being sandwich cell walls. Regular structures with three, four or six cell walls (i.e. triangles, squares, rectangles, hexagons) can be tessellated, i.e. formed into a repetitive structure with no gaps (see FIG. 13). Referring to FIG. 13, the macroscopic cell structures can include hexagonal cells 50, with a three arm motif 51, square or rectangular cells 52, with a three arm motif 53, whereby each row is offset from the neighbouring rows, square or rectangular cells 54, with a four arm motif 55, whereby the cell walls of each row are aligned with the cell walls of the neighbouring rows, triangular cells 56, with a four arm motif 57 whereby each row is offset from the neighbouring rows, or triangular cells 58, with a six arm motif 59, whereby the cell walls of each row are aligned with the cell walls of the neighbouring rows. Structures of these types with three, four or six cell walls can be formed from multi-arm such as three-arm (50, 51, 52, 53), four-arm (54, 55, 56, 57) or 6-arm (58, 59) structures whereby the arms such as the three, four or six arms radiate out in a diverging manner from a centre. The cell walls are part of macroscopic cells of the macroscopic honeycomb core.

Figure 2:
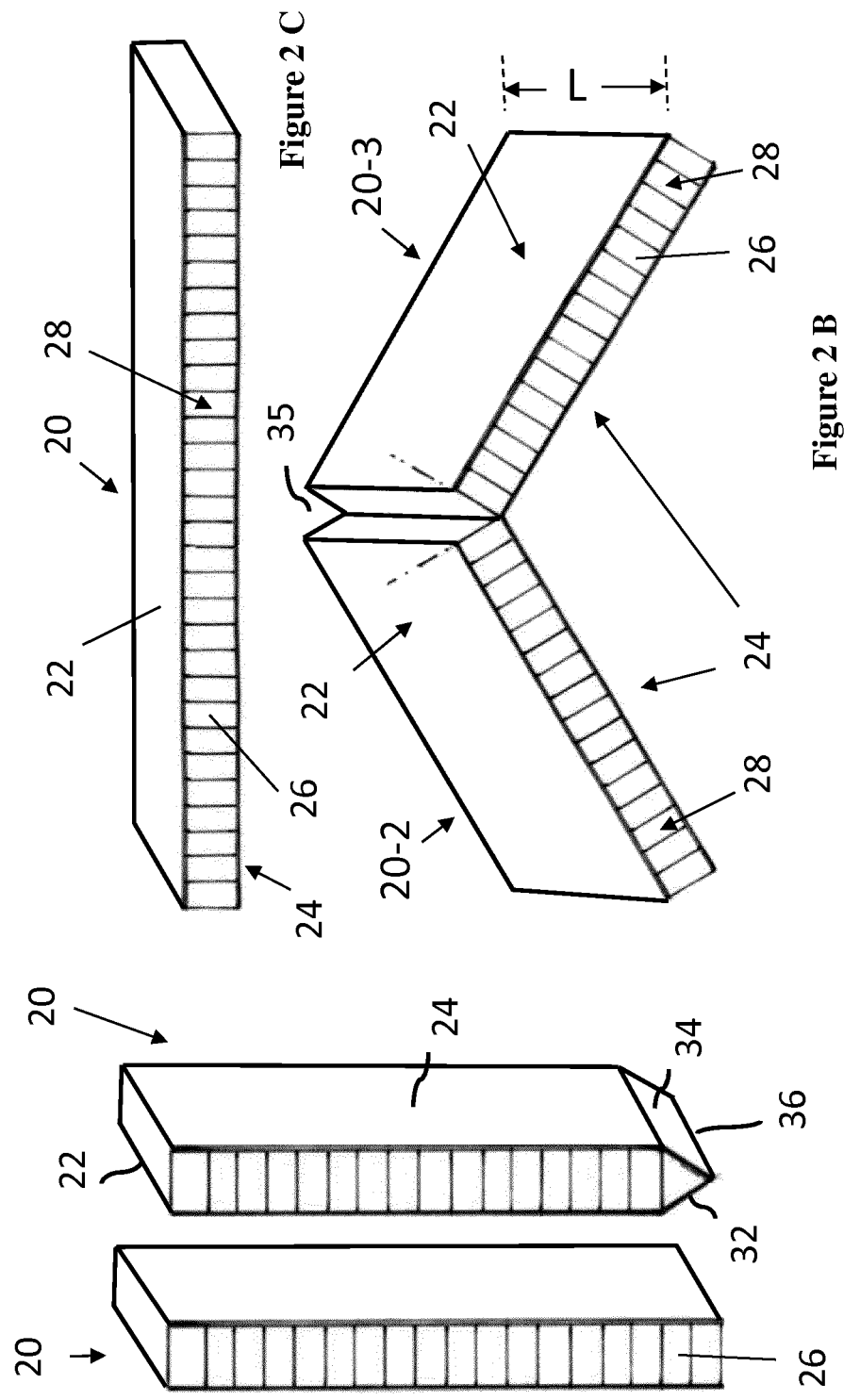
FIGS. 2A, 2B and 2C show elements of sandwich material for use in embodiments of the present invention.

With reference to FIG. 2A the sandwich material 20 which makes up the cell walls 1-6 has outer skin layers 22, 24, one on each major surface. The sandwich material has a mesoscopic core 26 between the outer skin layers 22, 24. The outer skin layers 22, 24 are connected or attached or joined to the mesoscopic core 26. Such a connection can transfer tension forces across the connection or compressive or shear forces. For example, a form fit connection without a specific bonding but with a form fitting connection can also be adapted to transfer tension. As a further example, connections of layers such as skin layers can be connected by fusion bonding such as welding or can be joined by an adhesive or glue. The means of connection, i.e. welding or gluing, can, as an option, be continuous from top to bottom of the cell walls of the macroscopic cells. However, a bond along less than the complete height can also be made. The bond can be discontinuous but should not be a single point connection.

The mesoscopic core 26 has cavities 28 in the form, for example, of mesoscopic honeycomb cells or foam cells. The longitudinal axis of the cavities, e.g. of the mesoscopic honeycomb cells or of the elongated foam cells is preferably perpendicular to the longitudinal axis of the macroscopic honeycomb cells in the assembled hierarchical sandwich core. The sandwich material 20 can be made of thermoplastic materials or thermoplastic composite materials, e.g. suitable for fusion bonding such as weldable thermoplastic materials, but alternatively can be partly or completely made of metals or thermoset composite materials that can be joined by adhesive or glue. The hierarchical sandwich core 10 in the form of a macroscopic honeycomb core according to embodiments of the present invention can have superior mechanical properties per weight, due to formation of macroscopic honeycomb with all cell walls being single sandwich material cell walls, which provide better compression buckling and shear buckling performance per weight than the monolithic single or double layer cell walls in conventional honeycombs.

Where fusion bonded connections such as welded joints are made between sandwich material layers, this allows to have the skin layers of the sandwich material layers orientated vertically with their lengthwise direction, which is an important advantage if unidirectional fibre reinforced tapes are used as skins of the sandwich cell walls.

The perfectly regular macroscopic honeycomb cells are made up of a repetitive motif having a number of radiating arms joined at their centre such as three, four or six radiating arms joined together at their centre. With respect to each macroscopic honeycomb cell, repetitive use of a three arm motif will result in two of the radiating arms forming two cell walls of part of one macroscopic honeycomb cell and the third arm forming a single cell wall of an adjacent macroscopic honeycomb cell. Each cell wall of the plurality of macroscopic honeycomb cells such as cell walls 1 to 6 of the plurality of macroscopic honeycomb cells consists of a single thickness, i.e. of the sandwich material 20.

Figure 3:
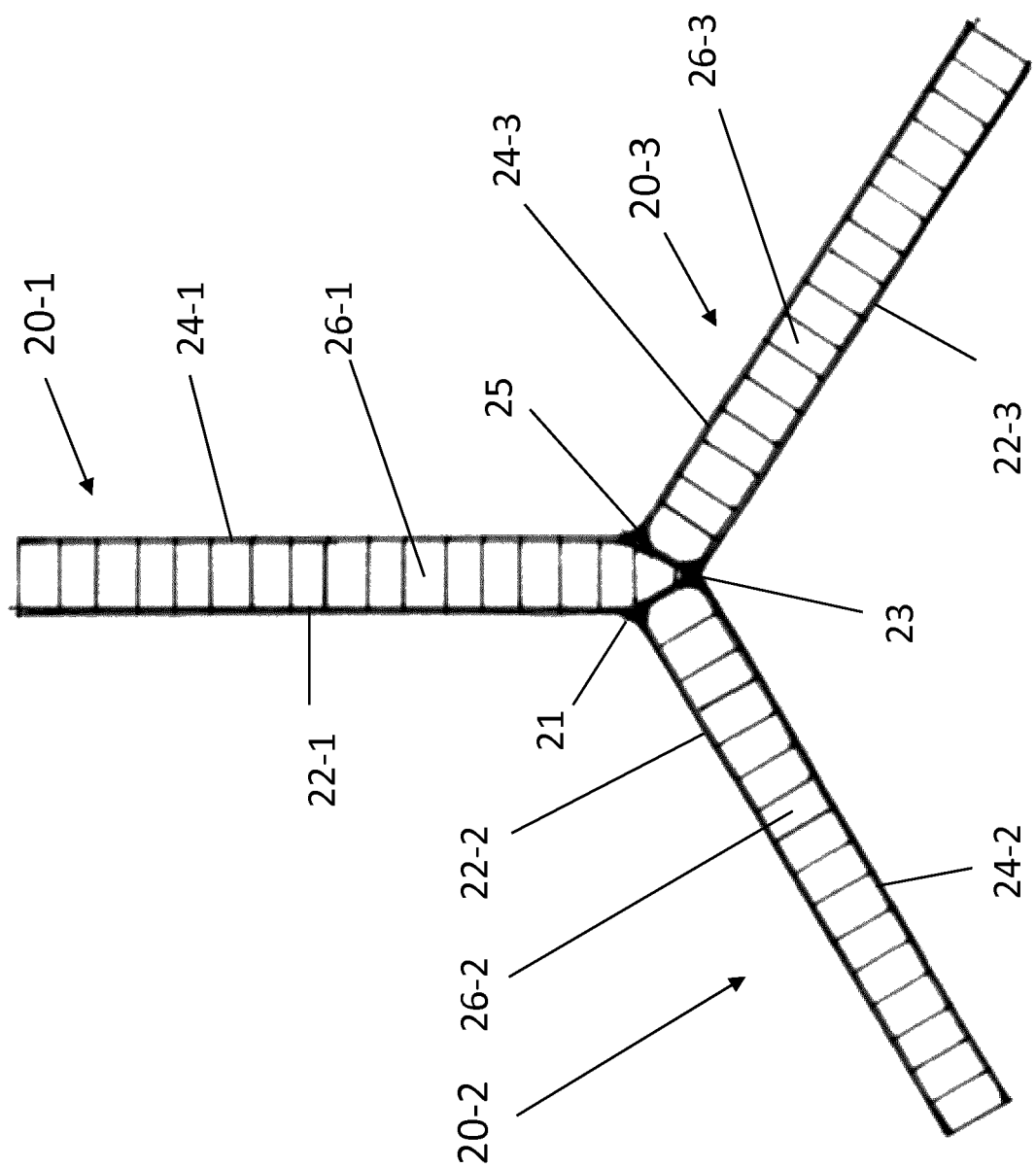
FIG. 3 shows a three arm motif as used in embodiments of the present invention.

A motif for use in embodiments of the present invention with three radiating arms is shown schematically in FIG. 3. It has three arms 20-1, 20-2, 20-3, each of the arms having two outer skin layers, 22-1, 24-1; 22-2, 24-2; 22-3, 24-3 and a core 26-1, 26-2, 26-3, respectively. The cores 26-1 to 26-3 comprise a mesoscopic honeycomb core or a foam core. At the centre of the three radiating arms, these are connected together in such a way that both skin layers 22-1, 24-1; 22-2, 24-2; 22-3, 24-3 of any arm 20-1, 20-2, 20-3 are preferably connected permanently to at least both skin layers of another arm at the central meeting point of the arms and preferably connected permanently to all skin layers of all the arms so that the skin layers 22-1, 24-1; 22-2, 24-2; 22-3, 24-3 are mechanically continuous through the centre of the three radiating arms. The connections can be made along the height L (see FIGS. 2A and B) of the macroscopic cells thus creating line connections. A connection being less than the complete height L is also included within the scope of the present invention. However, even in this case the connections are not point connections but are distributed along the sandwich material 20 from top to bottom of macroscopic cells are a part thereof. Permanent connections can be made, for example, by fusion bonding such as welding (e.g. thermal or sonic welding), soldering, or with adhesive or glue. Hence, in the final macroscopic honeycomb, both skin layers of each sandwich cell wall are connected to both skin layers of at least one neighbouring sandwich cell wall and preferably are connected to all skin layers of all neighbouring cell walls to which they are joined. The connection can transfer tension forces across the connection or compressive or shear forces. For example, a form fit connection without a specific bonding but with a form fitting connection can also be adapted to transfer tension forces.

Optionally, the connections can be continuous from top to bottom of the cell walls of the macroscopic cells, i.e. along the length L.

The starting materials for production of a macroscopic core 10 as shown in FIG. 1 are shown in FIG. 2A. They comprise two separate layers of mesoscopic sandwich material 20, each of which has two outer skin layers 22, 24 and a mesoscopic core 26. In this embodiment one of the elements of mesoscopic sandwich material 20 comprises a knife edge or wedge 36 (see FIG. 2A). The mesoscopic core 26 can comprise honeycomb cells or foam cells. The outer skins 22, 24 of the sandwich material 20, and/or the mesoscopic core 26 or the whole of the sandwich material 20 may be made of thermoplastic material such as a polymeric foil, a laminate of similar or differing materials, a polymeric composite layer having a fibre reinforcement or a fibrous layer having a polymeric impregnation. Each of these can be made of a polyolefin such as high density polyethylene or low density polyethylene or polypropylene or a polyamine, a vinyl polymer, a polystyrene, a polycarbonate, PET, PPS, PEI, PEEK, PEKK, PI or other thermoplastic polymer either alone or in mixtures or copolymers of any of these or may be made of metals such as aluminium, steel or titanium or thermosetting composite materials. They can also be made from an air permeable or water permeable material like a mesh, a grid or an open weave or non-woven material or a punctured plastic or punctured metal foil to allow the venting of the hierarchical sandwich core material.

Some skin layers 22 and 24 of the sandwich material 20 for use in some embodiments in which sandwich material 20 has the knife edge or wedge 36, have extensions 32, 34 which extend the skin layer or layers 22, 24 to the knife edge or wedge 36. Such extensions 32, 34 can be formed by removing part of the core 26 to produce two flaps 32, 34 of skin layers 22, 24 and then joining the flaps together, or removing some of the core 26 and one of the skin layers 22, 24 to make a remaining part of the other skin layer 24, 22 long enough to wrap around the knife edge or wedge 36 and join up with the other skin layer 22, 24. Another method of preparing this element is to crush or melt down the end of a sandwich layer 20 to bring the extensions 32, 34 of the skin layers 22, 24 together at the knife edge or wedge 36. Where the mesoscopic core is a foam, collapse of the foam can be achieved by application of both pressure and heat. Formation of the knife edge or wedge 36 is shown schematically in FIG. 2A and in FIG. 4A.

Figure 4:
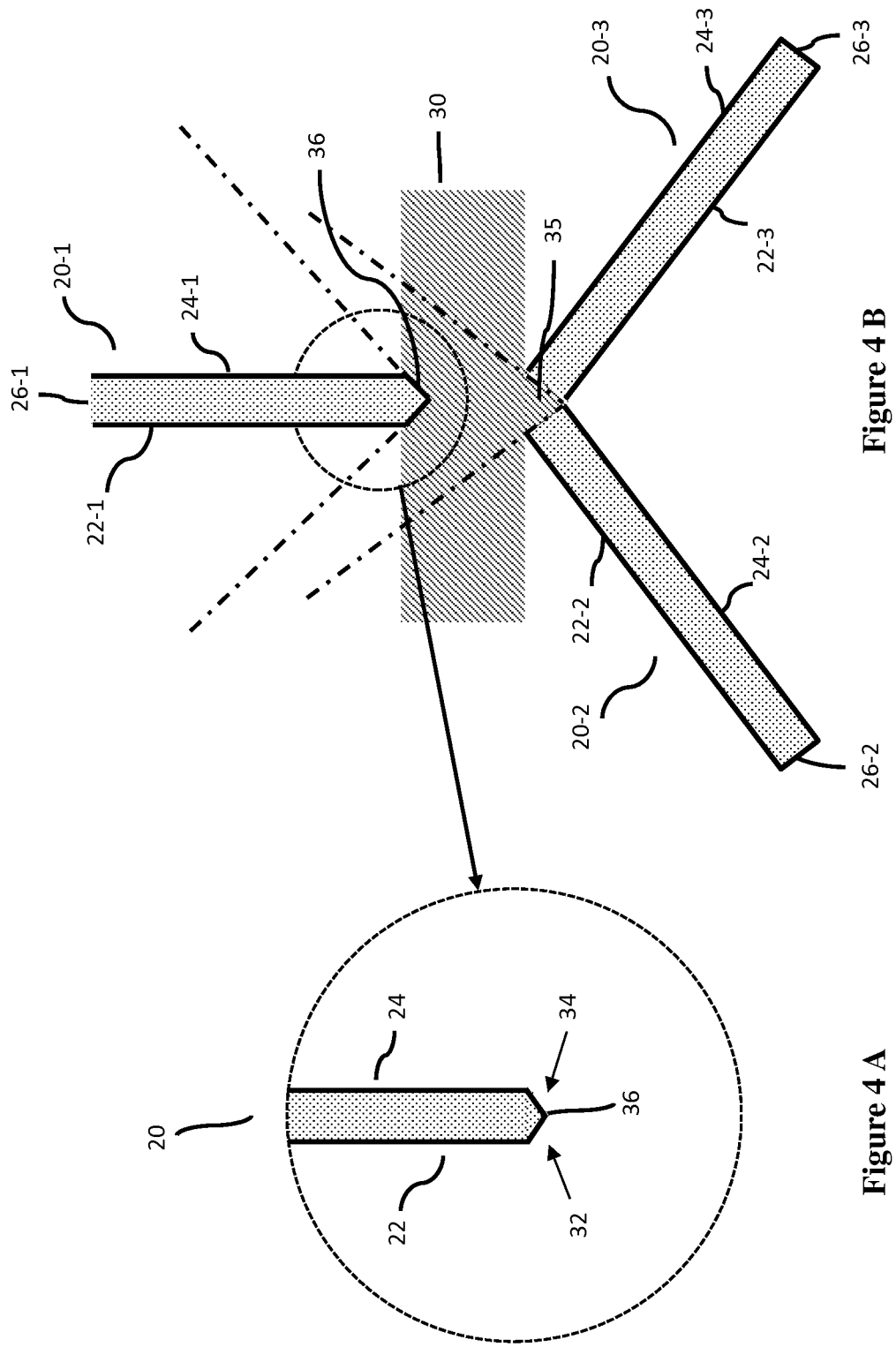
FIGS. 4A and 4B show how a three arm motif can be produced as an embodiment of the present invention.

A method of joining together multiple arms such as three arms 20-1 to 20-3 to form the motif is shown schematically in FIGS. 4A and 4B. Starting from a flat piece of sandwich material 20 (see FIG. 2C) having outer skins 22 and 24, an opening 35 is made by subtractive machining (which includes cutting) in at least a first skin layer 22 of a sandwich material 20 as well as cutting through or removing the mesoscopic core 26 of the sandwich material 20 having mesoscopic cells—see FIG. 2B. This forms two arms 20-2 and 20-3 of the motif (see FIG. 2B and FIG. 4B). The opening 35 in the sandwich material 20 preferably extends over the complete length L of the sandwich material 20 which is the width of the sandwich material 20. The subtractive machining can result in forming a chain of at least a first and a second arm 20-2, 20-3 of the motif whereby the at least first and second arms 20-2, 20-3 are joined together, for example, by an intact remaining second skin layer 24 (see FIG. 2B) or by a separate adhesive foil applied at the subtractive machining position, i.e. at the opening 35. Thus, the two arms 20-2, 20-3 can be joined by a hinge formed from the second skin layer 24 or alternatively a foil. The two arms 20-2 and 20-3 will each become a sandwich cell wall of a macroscopic honeycomb core. A further arm 20-1 is formed with a knife edge or wedge 36 having extensions 32, 34 of skin layers 22 and 24 up to the knife edge or wedge 36 (see FIGS. 2A and 4A). In some embodiments of the present invention arms 20-2 and 20-3 are then rotated to open up the opening 35 between arms 20-2 and 20-3 (see FIG. 2C and FIG. 4B). The knife edge or wedge 36 and extensions 32, 34 of arm 20-1 is/are then joined permanently into the opening 35 between arms 20-2 and 20-3 by fusion bonding such as welding including for example sonic welding, by soldering or with adhesive or glue. One method is to use a heated tool 30 (see FIG. 4B) which has a V-groove for receipt of, and heating/melting/softening of, the knife edge or wedge 36 of arm 20-1 and the adjacent skin layers 32, 34 as well as a triangular protrusion which fits into and heats/melts the opening 35 between arms 20-2 and 20-3. Using the heating tool 30 the materials at the end of arm 20-1 and the materials of arm 20-2 and 20-3 are fusion bonded such as softened or melted after which the tool 30 is removed and the pointed end of arm 20-1 is introduced into the opening 35 between arms 20-2 and 20-3. A pointed end or knife edge or wedge 36 of arm 20-1 is joined into the opening 35 between 20-2 and 20-3 by any suitable form of fusion bonding such as melting/bonding/connecting or gluing with adhesive, or form fitted to form the three arm motif having radiating arms 20-1 to 20-3 joined at the centre (see FIG. 3) including the skin layer joints 21, 23, 25 being joined together. The end of arm 20-1 and the materials of arm 20-2 and 20-3 are fusion bonded such as softened or melted across the complete width of the sandwich material 20. The pointed end of arm 20-1 is an edge that extends across the width of the sandwich material and this is introduced into the opening 35 between arms 20-2 and 20-3. The pointed end or knife edge or wedge 36 of arm 20-1 is joined into the opening 35 between 20-2 and 20-3 by any suitable form of fusion bonding such as melting/bonding/connecting across the complete width of the sandwich material 20 or a part thereof but not just a single point connection. This forms a three arm motif having radiating arms 20-1 to 20-3 joined at the centre across the complete width of the sandwich material 20 The skin layer joints 21, 23, 25 are joined together by this procedure which results in there being continuity of the skin layers through the connection which provides good mechanical properties. The connection can transfer tension compressive or shear forces across the connection. For example, a form fit connection without a specific bonding but with a form fitting connection can also be adapted to transfer tension. As a further example, connections can be made by fusion bonding such welding or can be joined by an adhesive or glue. The means of connection, i.e. welding or gluing, can, as an option, be continuous from top to bottom of the cell walls of the macroscopic cells. However a bond along less than the complete height can also be made. The bond can be discontinuous but a single point connection would be less preferred or should, preferably even be avoided.

More arms such as four or six can be joined in a similar manner.

By repetition of this three arm motif and by joining these together, sandwich material cell walls are formed of a macroscopic honeycomb core. For a four sided (e.g. square, quadrilateral or rectangular) honeycomb core using three-arm structures no rotation/folding/opening of the arms on each side of the opening 35 in the sandwich material would be required (see FIG. 13, reference number 53 indicating a three arm motif of honeycomb core 52). Instead, the subtractive machining should make a suitably shaped opening 35 across the width of the sandwich material without the need for rotation. For other honeycomb cores requiring multi-arm structures such as four arms (FIG. 13, reference number 55 indicating a four arm motif of a honeycomb core 54 or reference number 57 of a four arm motif of a honeycomb 56) two arms can be connected into one opening 35 at the same time. For six-arm structures (FIG. 13, reference number 59 of a six arm motif of a honeycomb core 58) the six arms are brought together and connected together at the same time.

Whatever the number of cell walls in the macroscopic honeycomb core, the method then continues with repeating the subtractive machining and connecting steps to form, for example, a first row of connected multi-arm such as three, four or six arm motifs. The first row can be connected to other rows by means of repeating the same type of connections as used for joining the centre of the multi-arm such as three arm, four arm or six arm motifs to form a macroscopic honeycomb structure with sandwich cell walls, e.g. using a method of connecting as described with reference to FIGS. 4A to 4B applied to the rows. The first row can be connected to other rows by means of repeating a different type of connection than the one used for joining the centre of the multi-arm such as three-arm, four arm or six arm motifs. For example the arms such as that three arm, four arm or six arm motifs can be joined at their centre by welding whereas the rows may be joined by adhesive or glue or vice versa. The result of these methods is that in cell walls of cells of the macroscopic honeycomb core both skin layers of each sandwich cell wall are connected to both skin layers of at least one neighbouring sandwich cell wall and preferably are connected to skin layers of all neighbouring cell walls.

Figure 9:
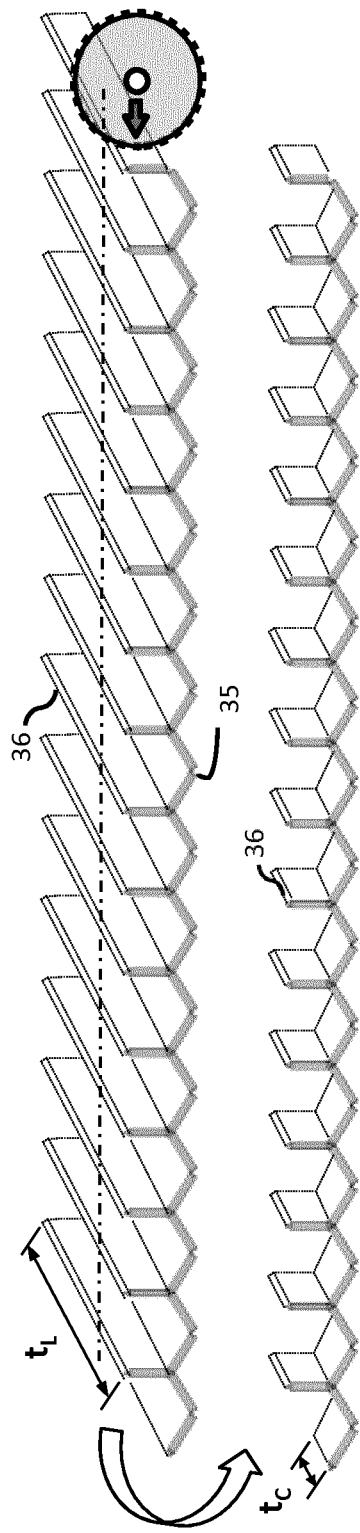
Figure 9:
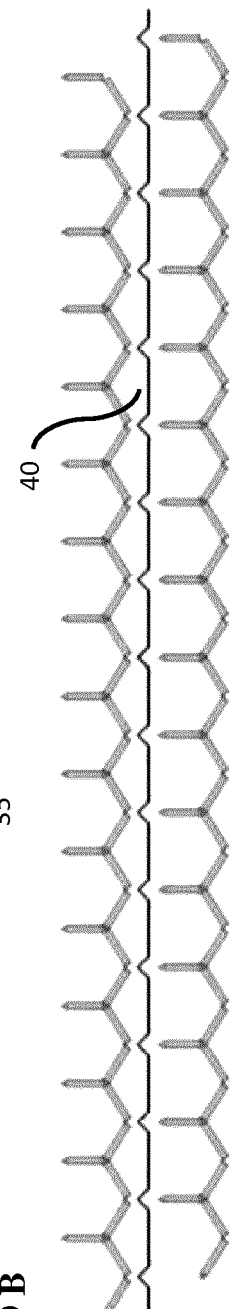
Figure 9:
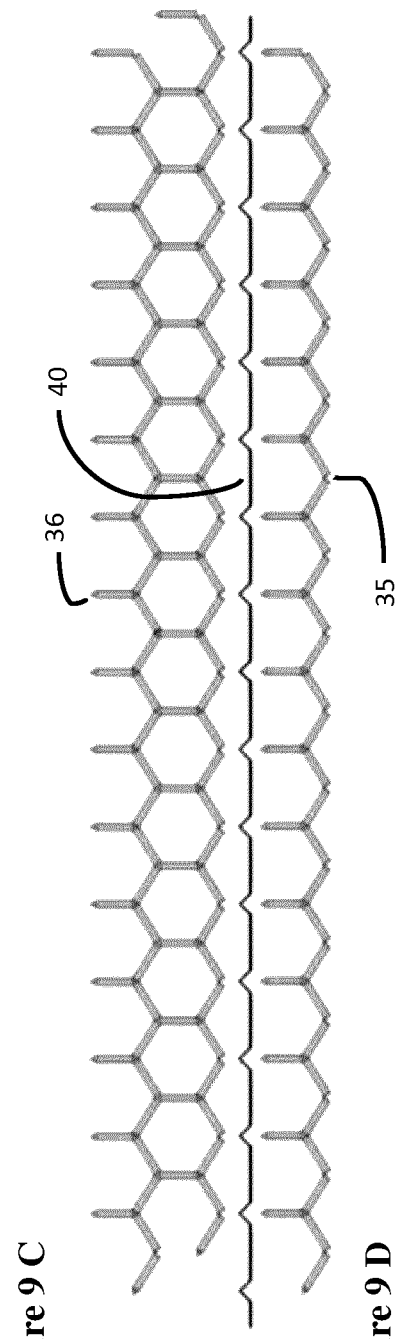

The rows of multi-arm, such as three, four or six arm motifs are preferably long in the thickness direction of the macroscopic honeycomb structure ($t_L$ in FIG. 9B) so that many rows of multi-arm such as three, four or six arm motifs can be cut to obtain rows in the desired macroscopic honeycomb thickness ($t_C$ in FIG. 9B). The repeated connection of rows is easier to realize and automatize when they are first cut to the desired thickness.

In the following the production of three arm motifs and hexagonal macroscopic cells will be described, but the invention is not limited thereto. FIGS. 5A to 6B show a mirror heating element 40 that is shaped so that it can be used to form a long strip of half-hexagonal cell material. Each strip can be long such as up to 3 m long in a direction perpendicular to the plane of the figures and can be cut lengthwise at the end of a production line. In this first step a heating element 40 can be used to create an opening 35 at a position along one third of the sandwich material 20 (one cell wall). This is then folded/rotated by 30° after heating with the mirror heating element 40 (this works well with thermoplastic skins and does not require a slitting)—see FIG. 5B—to form the opening 35. The shaped heating element 40 is then used to create a further opening 35 at a position of one third from the other edge of the sandwich material 20 as shown in FIGS. 6A and 6B followed by rotation.

The mirror heating element 40 can be a special mirror element in a standard butt-welding unit. However, the half-hexagonal long sandwich strip as shown in FIG. 6B could also be made by a continuous lengthwise slitting and folding/rotation process.

FIGS. 7A to 7C show the fusion bonding, e.g. mirror welding of a second sandwich material 20 to the first strip of FIG. 6B using the heating tool 40. A strip of sandwich material 20 has a knife edge or wedge 36 formed with extension(s) of the outer skin layers 22, 24 and the knife edge or wedge 36 is fusion bonded e.g. welded into one of the openings 35 as shown in FIG. 7B to result in the structure shown in FIG. 7C which already contains the Y-motif of three radiating arms joined at the centre. The heating tool 40 is used to create each opening 35 followed by rotation.

The heating tool 40 can then be used to create more opening 35 followed by rotation and to join more pointed strips by fusion bonding as shown in FIGS. 8A to 8C which show mirror welding of a third strip to two first strips of FIG. 7C.

This process is continued by using the heating tool 40 to create more openings 35 in strips followed by rotation and fusion bonding connections with pointed strips until a structure such as shown in FIG. 9A is created which shows one row of half-hexagonal cells after joining, e.g. after the fusion bonding/welding of 16 strips together. These strips could still be long e.g. 3 m long, dependent only upon the length of the butt-welding equipment for example. Preferably, the sheets made from the welded long strips are then cut to many smaller rows, e.g. to be as required to form the final macroscopic core thickness $t_C$ (shown schematically in FIG. 9B in which the structure of FIG. 9A is cut to the desired thickness $t_C$). The cutting to thinner strips can be done by conventional sawing and no block cutting is necessary for embodiments of the present invention. However, alternatively a honeycomb block could be produced (e.g. with a heated mirror welding sheet, which is pulled out while the rows are joint) and honeycomb sheets could be cut with a saw from such blocks.

FIGS. 9C and 9D show a top view of the mirror welding equipment having a heating element 40 when welding a second and third row to a first row. As previously a heating tool 40 is used to create openings 35 followed by rotation and fusion bonding. To increase the size of the macroscopic core, one new row is joined to previous rows as shown in FIGS. 9C and 9D which requires alternating shifting of the next row by half a width of a macroscopic cell. A standard butt-welding unit can be used for joining of the rows resulting in a method of fusion bonding/welding of the rows to form the macroscopic honeycomb core.

A further method of processing strips aims to avoid the step of alternating shifting of the rows or of shifting of the mirror heating tool 40 for the welding process. The process forms two-row units by the methods described above and then joins these. Joining two rows at a time, i.e. joining one two row unit to another two row unit, avoids the shifting and results also in a twice as fast welding process as is understandable from FIG. 10B. Furthermore, operating with two rows at a time in a two row unit will be more stable so that the cell walls stay better in place for the connecting e.g. fusion process such as a welding process.

Figure 10:
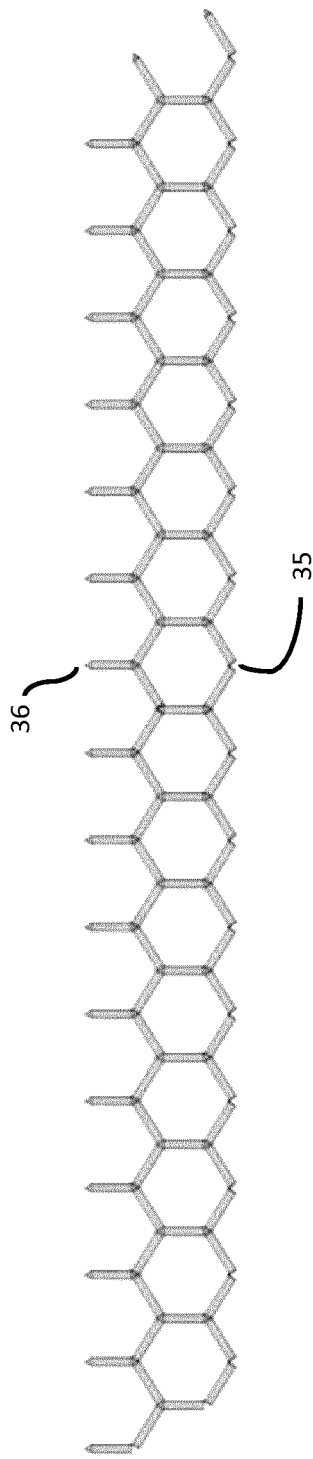
Figure 10:
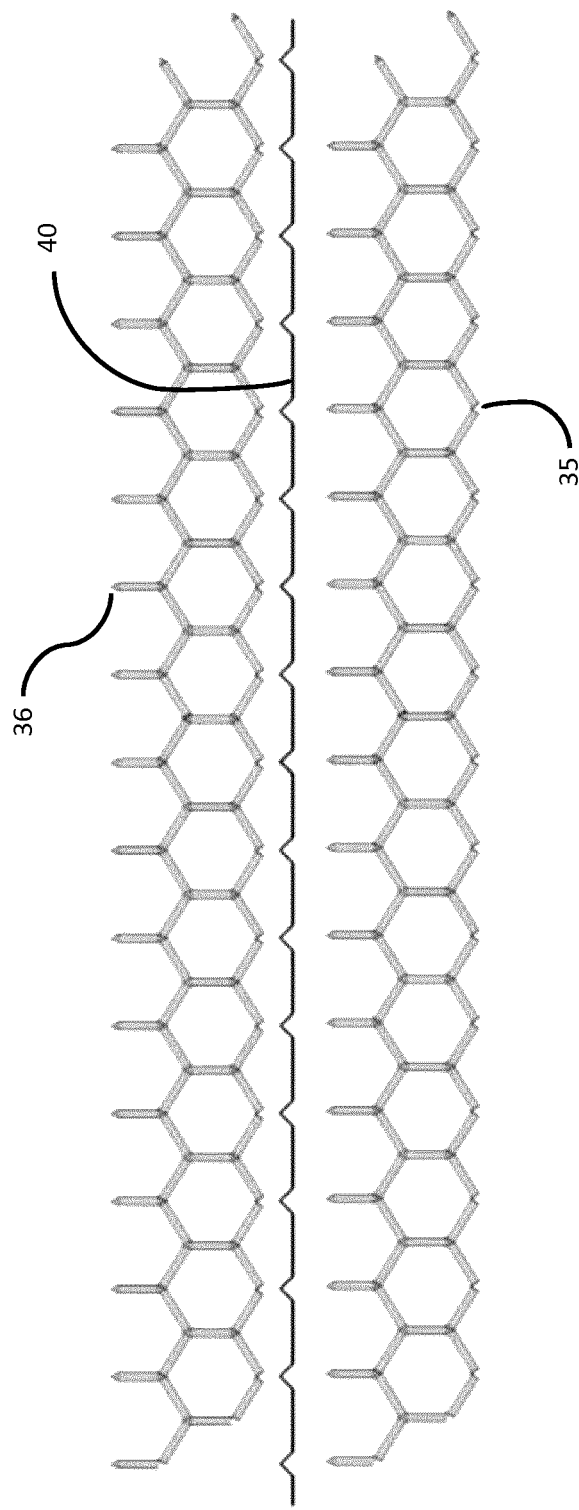

The two row units as shown in FIGS. 10A and B can still be cut by a normal blade saw from a 3 m long sheet.

For a reasonably fast process for the above methods, the rows or two row units should be joined, e.g. fusion bonded/welded together in the long direction of the core so that (e.g. for a 2.5×1.2 m typical core size) several 2.5 or 3 m long rows are welded together to create the 1.2 m width of the core.

Various methods can be used to create the two row units, each of which is an embodiment of the present invention. FIGS. 11A to 11C show the formation of a single row of half-hexagonal cells using a heating tool 40 to generate openings 35 followed by rotation and joining to further pointed strips. FIGS. 12A and B show how plural elements of the type shown in FIG. 11C can be joined, e.g. by fusion bonding/welding of this basic element (which in the third dimension can be 3 m long) to create the two row units. This fusion bonding/welding can also be faster since one mirror heating element 40 can be used to make two welds at the same time.

Two row units can always still be increased in size by joining additional elements with another joining, e.g. welding process step as shown in FIG. 12B.

The methods of any of the embodiments described above can be used to make a sheet having a hierarchical sandwich core in the form of a macroscopic honeycomb core. The macroscopic honeycomb core can comprise periodic lattice materials forming cells with cell walls made of a mesoscopic cellular structure. The hierarchical sandwich core comprises rows of cells, each cell comprising one or more chains of elements forming convex polyhedra with cell walls (e.g. three, four or six walls) linked by a connecting foil such as a thermoplastic foil between the elements. The convex polyhedra shaped cells are formed by repetitive attachment of multi-arm structures such as three, four or six arm structures having three, four or six radiating and diverging arms, respectively and joined at the centre, e.g. by welding, soldering, gluing or with adhesive. The convex polyhedra being joined together and arranged in rows thereby forming a macroscopic honeycomb core with macroscopic honeycomb cells. This core can then be covered by one or more cover layers such as with a plastic or composite layer such as a thermoplastic or thermoset composite with glass fibre or carbon fibre reinforcement, a mineral reinforced layer, a metal layer such as an aluminium, steel or titanium layer, a wood layer or a wood fibre based layer, a stone layer such as a slate layer etc. The covering layers can be connected to one or both major surfaces of the macroscopic honeycomb core by lamination, gluing, pressure, welding, soldering etc.

The hierarchical sandwich core can have a rather large macroscopic cell size because the sandwich cell walls are very buckling resistant. This results in a very low density and a faster production process of the macroscopic core. To avoid the buckling of the cover layers or skins between the supports of the hierarchical sandwich honeycomb (macroscopic dimpling), it is possible to use sandwich skins at least on the compression loaded side of the hierarchical sandwich structure. Such sandwich skins may contain skin layers and a mesoscopic honeycomb core and should be sufficiently thick to have sufficient bending stiffness to prevent the macroscopic dimpling.

The macroscopic cells of the hierarchical sandwich core can be filled e.g. with a foam, a fibrous material or a powder like silicon oxide to increase the thermal insulation performance. Due to the sandwich cell walls, the materials will have very good out-of-plane thermal insulation performance and a larger cell size makes the filling of the cells easier. The good bending resistance and the air tide connection of the sandwich cell walls and the use of barrier layers in the skins of the sandwich cell walls allows to keep a vacuum inside the macroscopic cells which increases the insulation performance and reduces the density of the material.

The present invention includes within its scope different ways of creating the multi-arm such as three, four or six arm structures comprising three, four or six radiating and diverging arms permanently joined together at the centre. The three arm structures can be Y- or T-structures, for example. Each such structure has a first and a second arm made of a first sheet having a first major surface and a thermoplastic core, the first and second arms being formed in a chain joined by a hinge formed from a second thermoplastic foil; a proximal end of a second sheet being joined into an opening between the first and second arms. The first arm can form a reflex angle of 100° to 180°, e.g. 120° with respect to the second arm, the second sheet bisecting the reflex angle to make a third arm of the Y or T-structures. The arms should be connected, preferably, in such a way that there is continuity of the skin layers through the connection.

For example, the opening in one sandwich material can have a first V shape, the proximal end of the second or another sandwich material can have a second wedge shape or knife edge V shape, and the second V shape or more than one V-shape is joined into the first V shape. The opening can be made by subtractive machining (including cutting) of the first skin layer and the mesoscopic core to form a chain of at least a first and a second sandwich cell wall element joined by a hinge formed from the second skin layer. A cell wall may also be added by melting/bonding/connecting in the sandwich cell wall element. The skin layers of a third sandwich cell wall are connected in the hinge between the first and second sandwich cell walls to make a first Y-structure or T-structure having three arms and a first permanent connection joining the three arms at the centre.

Subsequently, these steps of cutting or subtractive machining and connecting are repeated to form a first row of connected Y- or T-structures. More rows of Y- or T-structures are constructed and joined together to form a macroscopic honeycomb core with sandwich cell walls.

The rows of Y- or T-structures are preferably long in the thickness direction of the macroscopic honeycomb structure so that many rows of Y- or T-structures can be cut to obtain rows in the desired macroscopic honeycomb thickness. The repeated connection of rows is easier to realize and automatize when they are first cut to the desired thickness.

Figure 14:
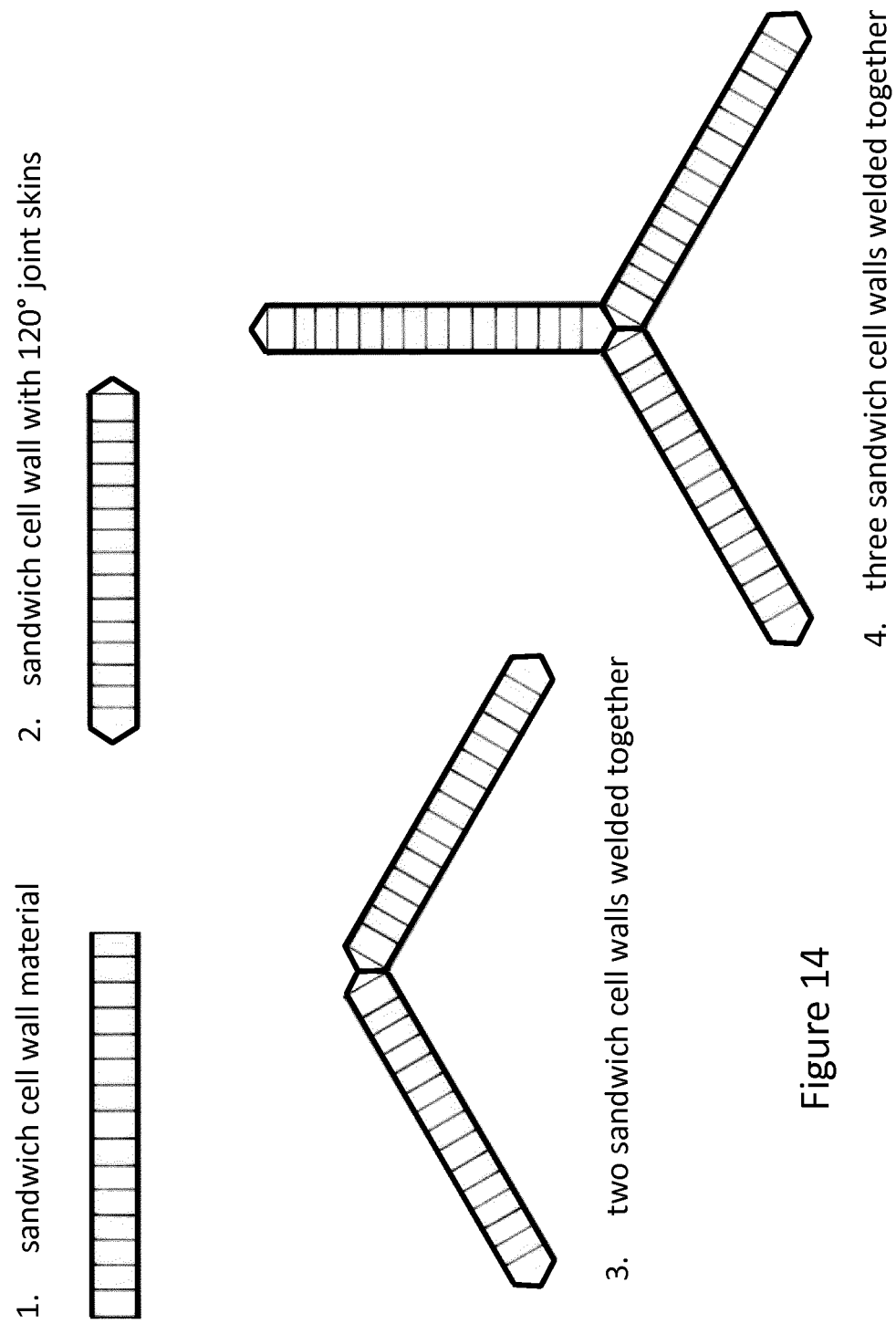
FIG. 14 shows how another three arm motif can be produced as an embodiment of the present invention.

Embodiments of the present invention do not need to form openings. As shown in FIG. 14, pieces of sandwich material 20 can be prepared with sharp end edges with the outer skin layers being joined together. Two pieces or all three pieces are connected together, e.g. by fusion such as welding, soldering or with adhesive or glue. The number of arms is three in FIG. 14, but the number can be increased, e.g. up to four or six. In all of these structures the outer skin layers of the sandwich material are connected through the connection to skin layers of adjacent cell walls, e.g. both skin layers on piece of sandwich material 20 are joined to all skin layers of all adjacent cell walls.

In any or all the embodiments of the present invention any connection can transfer tension compressive or shear forces across the connection. For example, a form fit connection without a specific bonding but with a form fitting connection can also be adapted to transfer tension. As a further example, connections can be made by fusion bonding such welding or can be joined by an adhesive or glue. The means of connection, i.e. welding or gluing, can, as an option, be continuous from top to bottom of the cell walls of the macroscopic cells. However a bond along less than the complete height can also be made. The bond can be discontinuous but a single point connection would be less preferred or should preferably even be avoided.

In any or all the embodiments of the present invention the hierarchical sandwich core can be in the form of a honeycomb made from sandwich cell walls each with a first skin layer on a first major surface and a second skin layer on a second major surface of a mesoscopic core with mesoscopic honeycomb cells, having both skin layers of each sandwich cell wall connected to both skin layers of at least one neighbouring sandwich cell wall and preferably of all neighbouring sandwich cell walls. The mesoscopic cellular structure can be made of a foam or is made from periodic lattice materials or is made from periodic lattice materials filled with foam.

The elements of sandwich material 20 as shown in FIG. 14 can be joined together in various ways in accordance with embodiments of the present invention. The arms such as three, four or six arms are linked together to form single thickness cell walls of the macroscopic honeycomb core in various different ways. For example, with reference to FIG. 15, a piece of sandwich material 20 is provided with pointed end edges where the skin layers on the sandwich material are joined together and with two slits at about one third and two thirds of its length. The outer elements are rotated to form a three-sided hollow U-shaped structure. This is attached to a similar structure by means of a single connection, e.g. by fusing such as welding or soldering or with glue or adhesive. By repeating this process half-hexagonal structures are produced. By joining rows hexagonal cells are formed.

Figure 16:
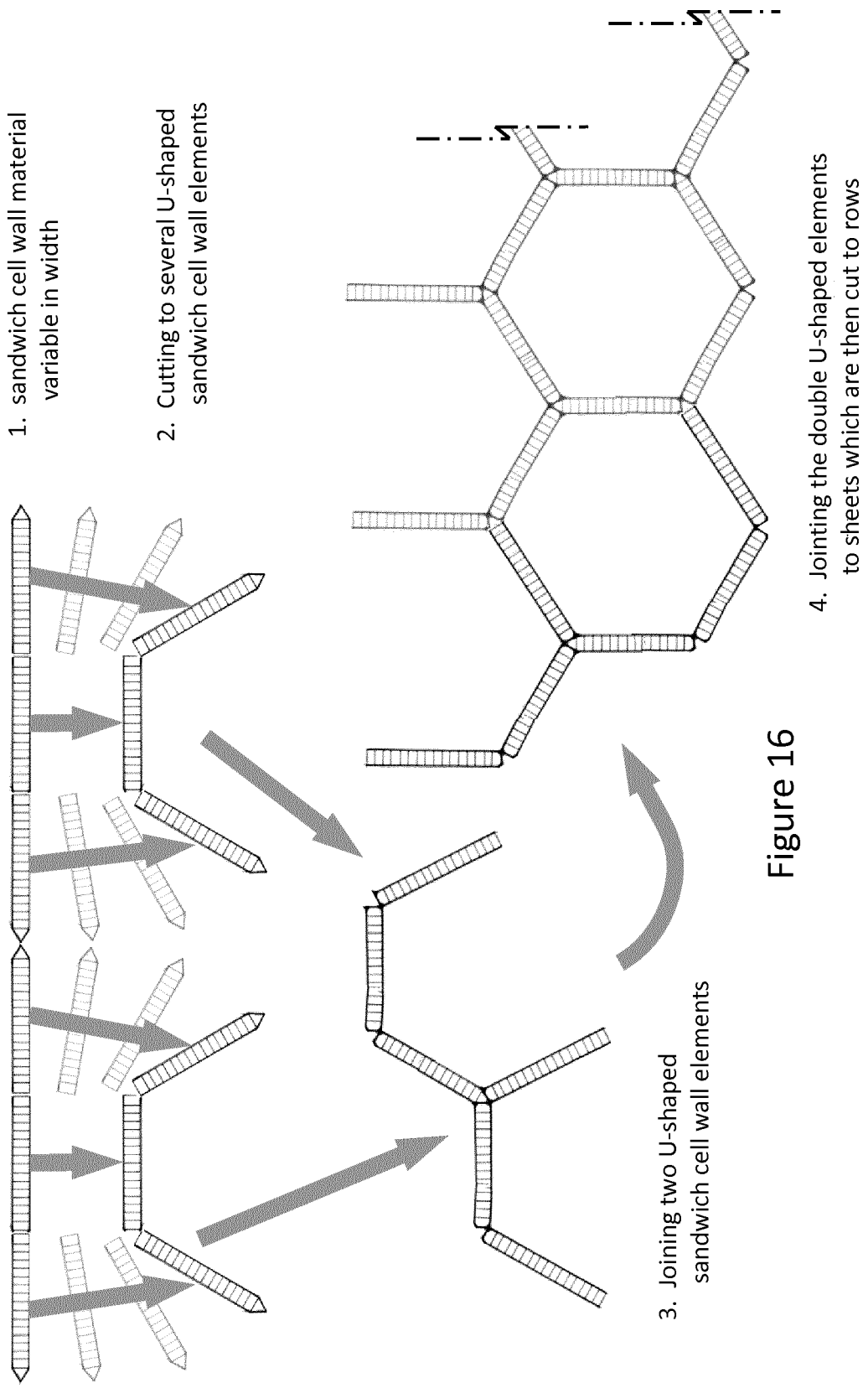

For example, with reference to FIG. 16, a piece of sandwich material 20 is provided with pointed end edges at both ends and in the middle as well with the sandwich material severed at this point to produce two separate pieces. A total of four slits are made at about one third and two thirds of each half-length piece of the sandwich material 20. The outer elements of the two pieces are rotated to form two three-sided hollow U-shaped structures with openings 35. These are then attached to each other to form a 6 element structure e.g. by fusing such as welding or soldering or with glue or adhesive. This 6 element structure is attached to a similar prepared 6 element structure by means of two connections e.g. by fusing such as welding or soldering or with glue or adhesive. By repeating this process hexagonal and half-hexagonal structures are produced.

Figure 17:
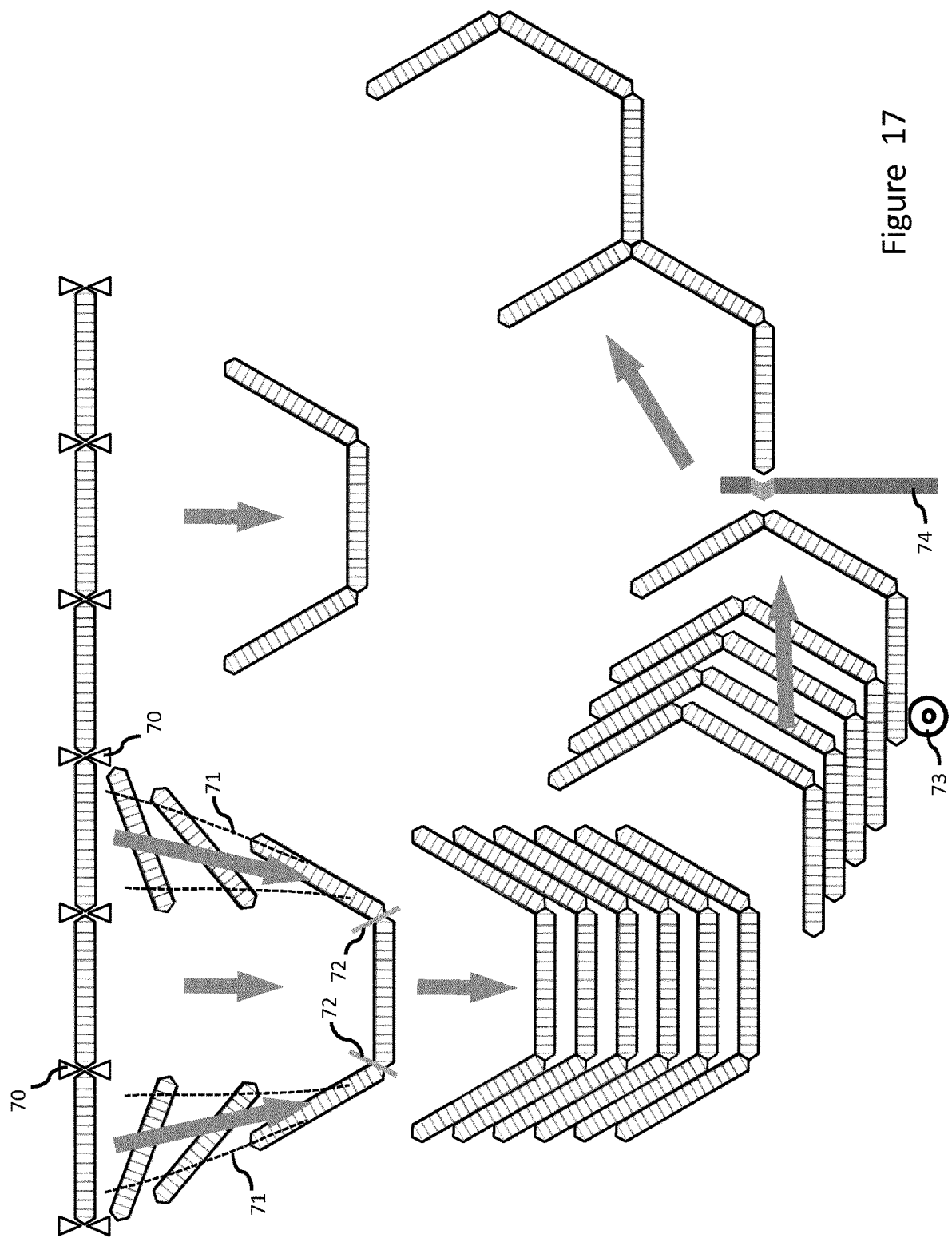
FIG. 17 shows how a hexagonal honeycomb can be built up from individual sandwich elements according to embodiments of the present invention.

For example, with reference to FIG. 17, three separate pieces of sandwich material 20 are provided each with pointed end edges where the skin layers on the sandwich material are joined together e.g. by fusing such as welding or soldering or with glue or adhesive. The outer elements are rotated and connected to form a three-sided hollow U-shaped structure, e.g. by fusing such as welding or soldering or with glue or adhesive. Many of these three element-shaped structures are stacked together. Each of three element structures are the picked up separately and attached to a similar structure by means of a single connection, e.g. by fusing such as welding or soldering or with glue or adhesive. By repeating this process half-hexagonal structures are produced.

Figure 18:
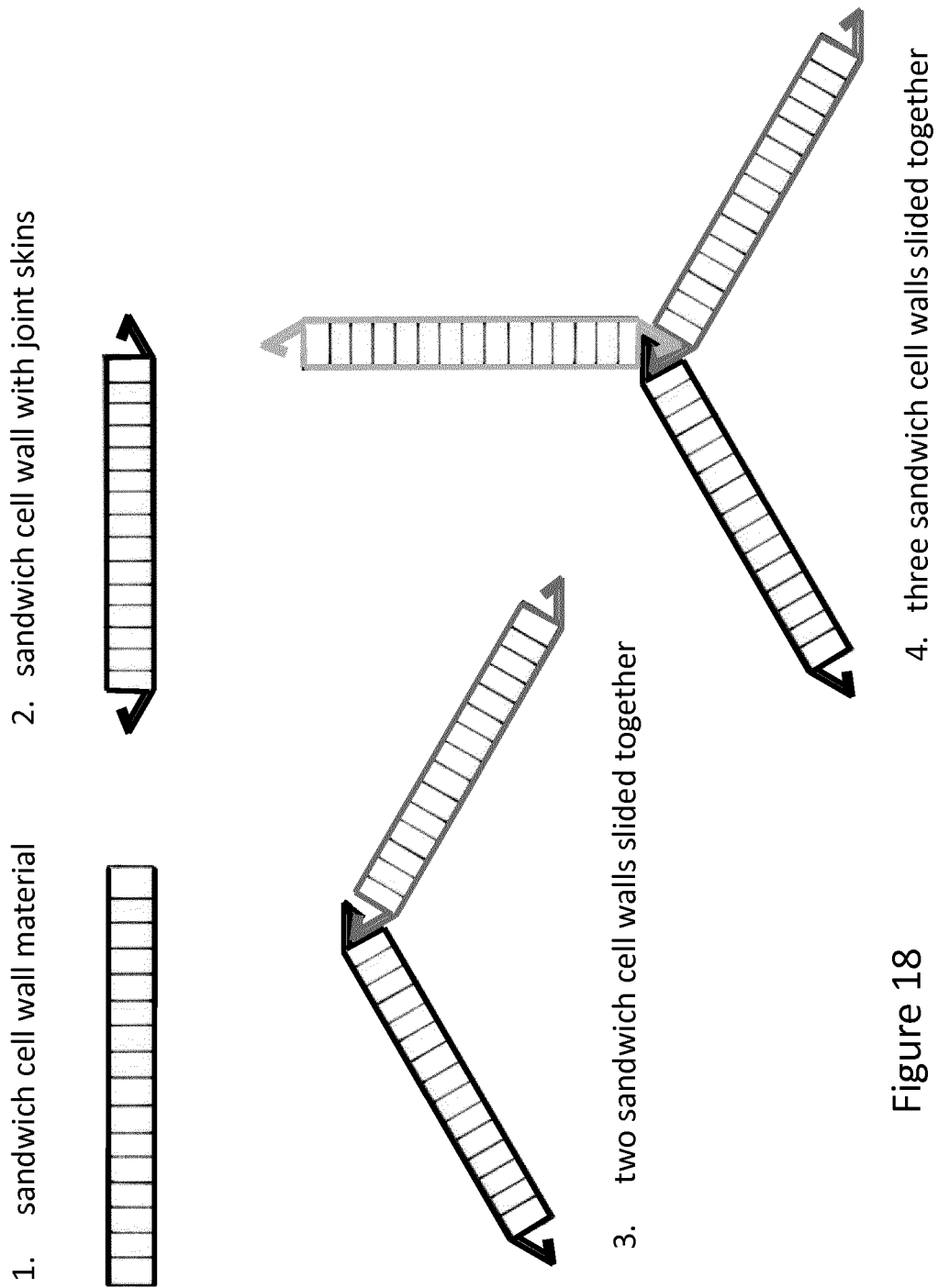
FIG. 18 shows how yet another three arm motif can be produced as an embodiment of the present invention.

Other methods can be used to make cells and cell walls of a macroscopic honeycomb in accordance with embodiments of the present invention. As shown in FIG. 18, two pieces of sandwich material 20 are prepared. On the ends of one piece the core 26 is removed or molten down and the extensions 32, 34 are pressed together, e.g. fused, such as welded or soldered, or glued or adhered together preferably to form a hook. Two such prepared pieces can be slid together and connected, to themselves or to yet another such piece or more such pieces of sandwich material 20, e.g. by fusing such as welding or soldering or with glue or adhesive, to form a three arm structure. The number of elements can be more than three, e.g. four or six, e.g. to form four or six arm structures. This embodiment has the advantage that only one type of piece of sandwich material 20 is needed.

Figure 19:
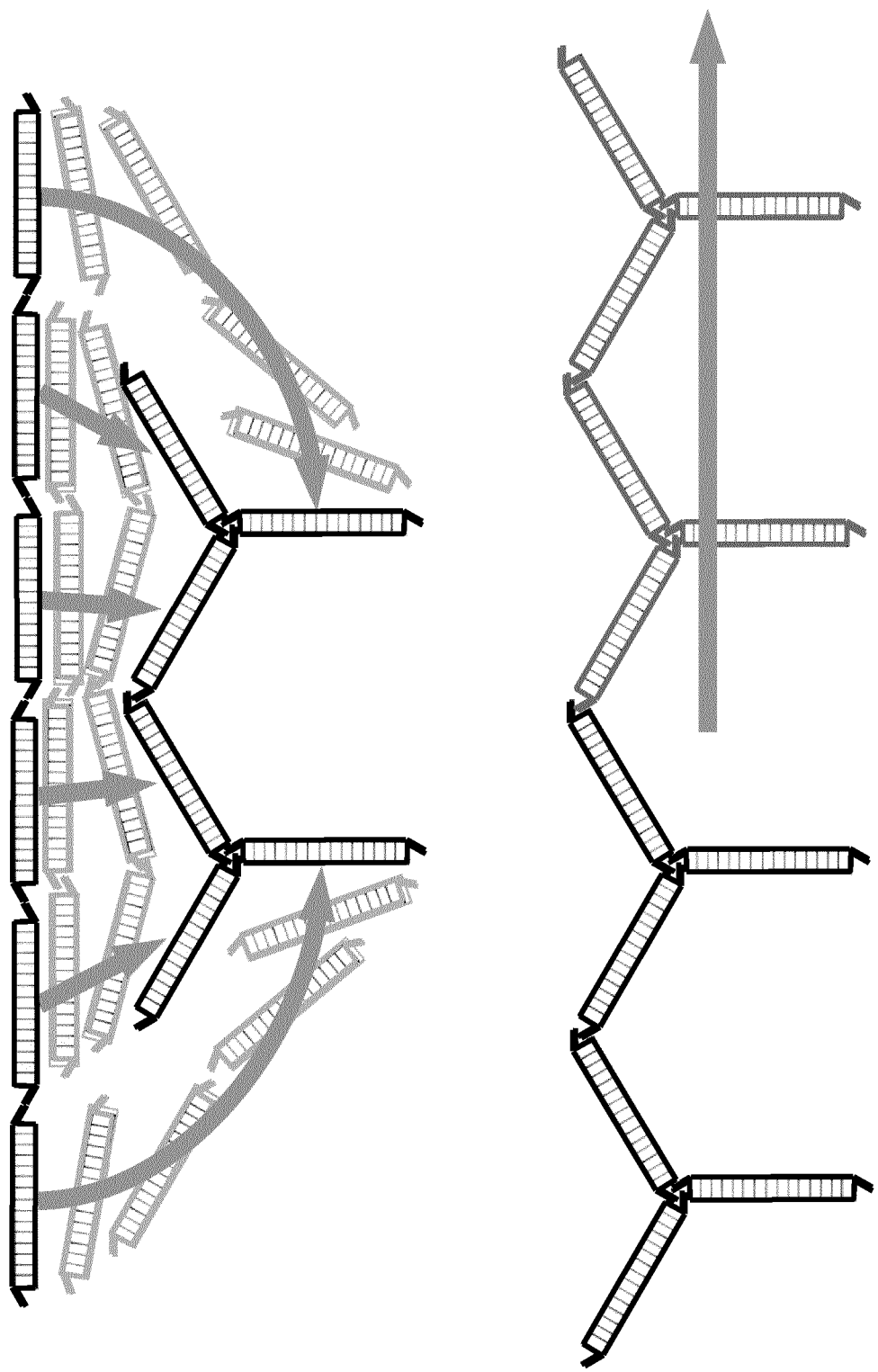
FIG. 19 shows how a hexagonal honeycomb can be built up from a three arm motif of FIG. 18 according to an embodiment of the present invention.

With reference to FIG. 19, six elements described with reference to FIG. 18 are connected e.g. by fusing such as welding or soldering or with glue or adhesive, to form a six element U-shaped product. Such a product is joined to another such product by a single connection, e.g. by fusing such as welding or soldering or with glue or adhesive, to form half-hexagonal rows.

The present invention also includes apparatus for making the hierarchical sandwich cores.

Figure 20:
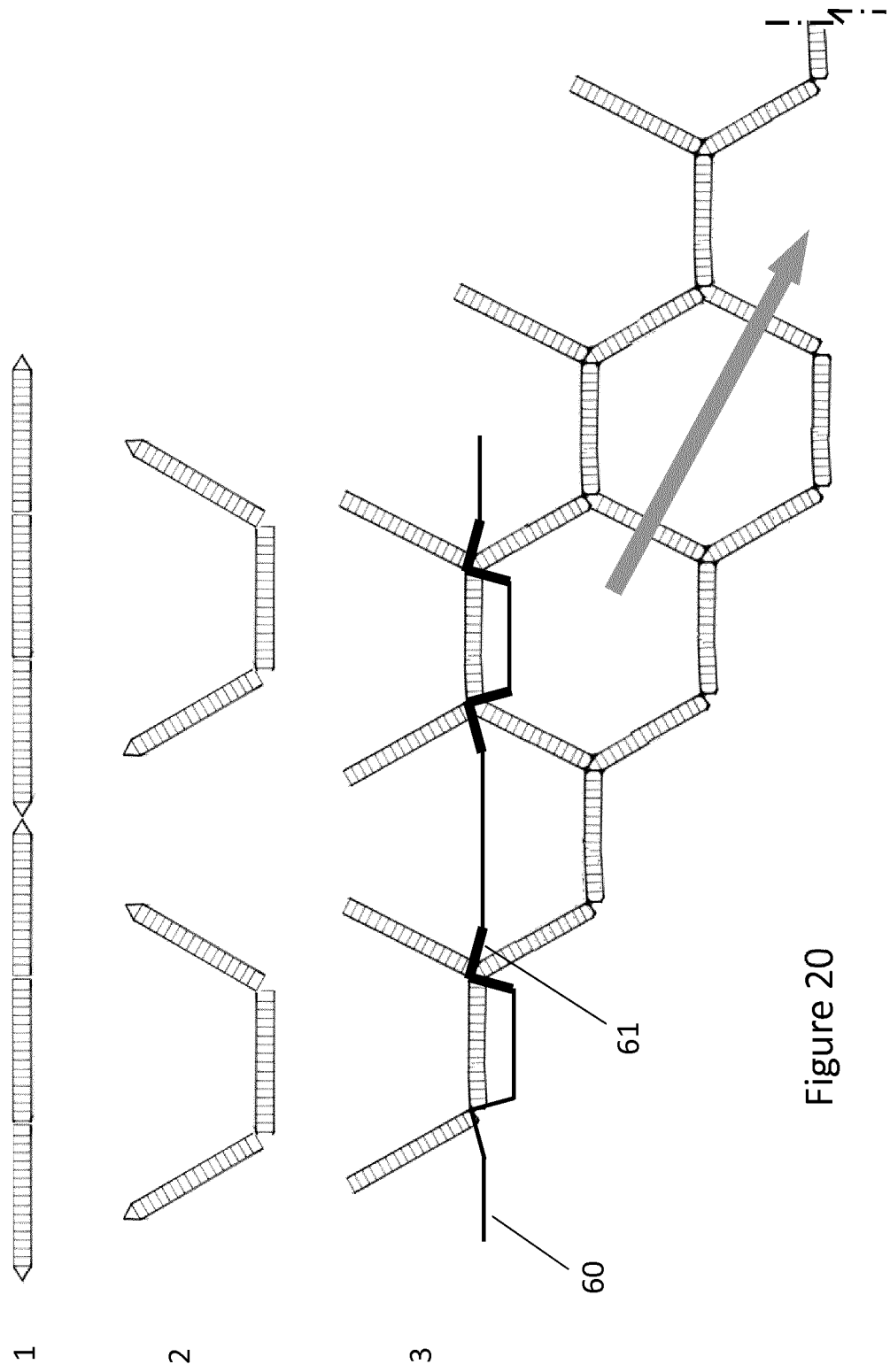
FIG. 20 shows how a heater and welder can be used to make multiple connections simultaneously according to an embodiment of the present invention.

For example the fusion such as welding of the knife edge or wedge of several sandwich cell walls is shown schematically e.g. in FIG. 20 for three sandwich cell walls. Elements of the sandwich material 20 with a knife edge or wedge of several sandwich cell walls are fused e.g. welded into the openings of several U-shaped products as is shown in FIG. 20 using a welding tool in form of a sheet 60 with heated corner elements 61. A continuously produced sandwich material could be cut, finished with pointed end edges and folded to U-shaped products, directly in-line. The tool 60 can be used in a mirror welding process, for example to connect the U-shaped products to several rows of the macroscopic honeycomb.

An embodiment of the present invention provides an apparatus for making a hierarchical sandwich core in the form of a macroscopic honeycomb with macroscopic cells and macroscopic cell walls made of a sandwich material having a mesoscopic core, the sandwich material having a first skin layer on a first major surface and a second skin layer on a second major surface, both skin layers of each sandwich material forming a cell wall of the macroscopic honeycomb being connected to both skin layers of at least one neighbouring cell wall, the apparatus comprising:

means for connecting pieces of sandwich material to make a connection unit having a centre and at least three arms diverging and radiating from the centre, in the centre both skin layers of each arm being connected to both skin layers of at least one neighbouring arm of the connection unit;

means for joining a first connection unit to a second connection unit by connections in which both skin layers of an arm of the first connection unit being connected to both skin layers of at least one neighbouring arm of the second connection unit;

means for repeating the joining step to form a row of connected connection units; and means for repeatedly connecting rows of connection units to form a macroscopic honeycomb structure with the macroscopic cell walls made of the sandwich material.

In any or all the embodiments of the present invention any connection can transfer tension compressive or shear forces across the connection. For example, a form fit connection without a specific bonding but with a form fitting connection can also be adapted to transfer tension. As a further example, connections can be made by fusion bonding such welding or can be joined by an adhesive or glue. The means of connection, i.e. welding or gluing, can, as an option, be continuous from top to bottom of the cell walls of the macroscopic cells. However a bond along less than the complete height can also be made. The bond can be discontinuous but a single point connection would be less preferred or should even be avoided preferably.

For example, an apparatus for forming the hierarchical honeycombs can include an apparatus A) as follows.

Means (70) for preparing the elements of sandwich material 20 (see FIG. 17) with sharpened ends by cutting them to the desired cell wall length and pressing and fusing, e.g. welding the ends together or by means of adhesive.

Means (71) to guide three of these elements and arranges them in a U-shaped structure.

Means (72) to mirror weld the three elements together by heating the ends of the elements and pushing the elements together to fuse the connections and to form a three element U-shaped structure or by means of adhesive.

Such equipment can work batch wise with elements cut to length on continuous with elements which are continuously produced and only cut to length after the several elements of the sandwich material are connected.

The process is repeated to form many three element U-shaped structures which are placed by the pick and place robot or just fall onto a stack.

From the stack one of the three element U-shaped structures is automatically fed by a roller (73) into position for heating by fusing equipment such as a mirror welding equipment (74) to connect by fusing one end of the three element U-shaped structure to a previously made three element U-shaped structure or by means of adhesive.

Repeat as many times as necessary to form rows of half honeycomb cells as shown in FIG. 17. These rows are then fused, e.g. welded together by a mirror welding equipment (40) as shown in FIGS. 9C and 9D or by means of adhesive.

FIG. 20 shows a different equipment for a more continuous fusing such as mirror welding with heating elements (61) on a sheet like tool (60) (or by means of adhesive).

Such a tool allows to weld many elements simultaneously to previously made U-shaped elements to produce to form rows of half honeycomb cells in a fast process.

Repeat process to join one row of elements to the rows of half honeycomb cells. As shown in FIG. 20, these rows are then fused e.g. welded together by a mirror welding equipment (40) as shown in FIG. 10B or by means of adhesive.

For example, an apparatus for forming the hierarchical honeycombs can include an apparatus B) as follows.

Figure 15:
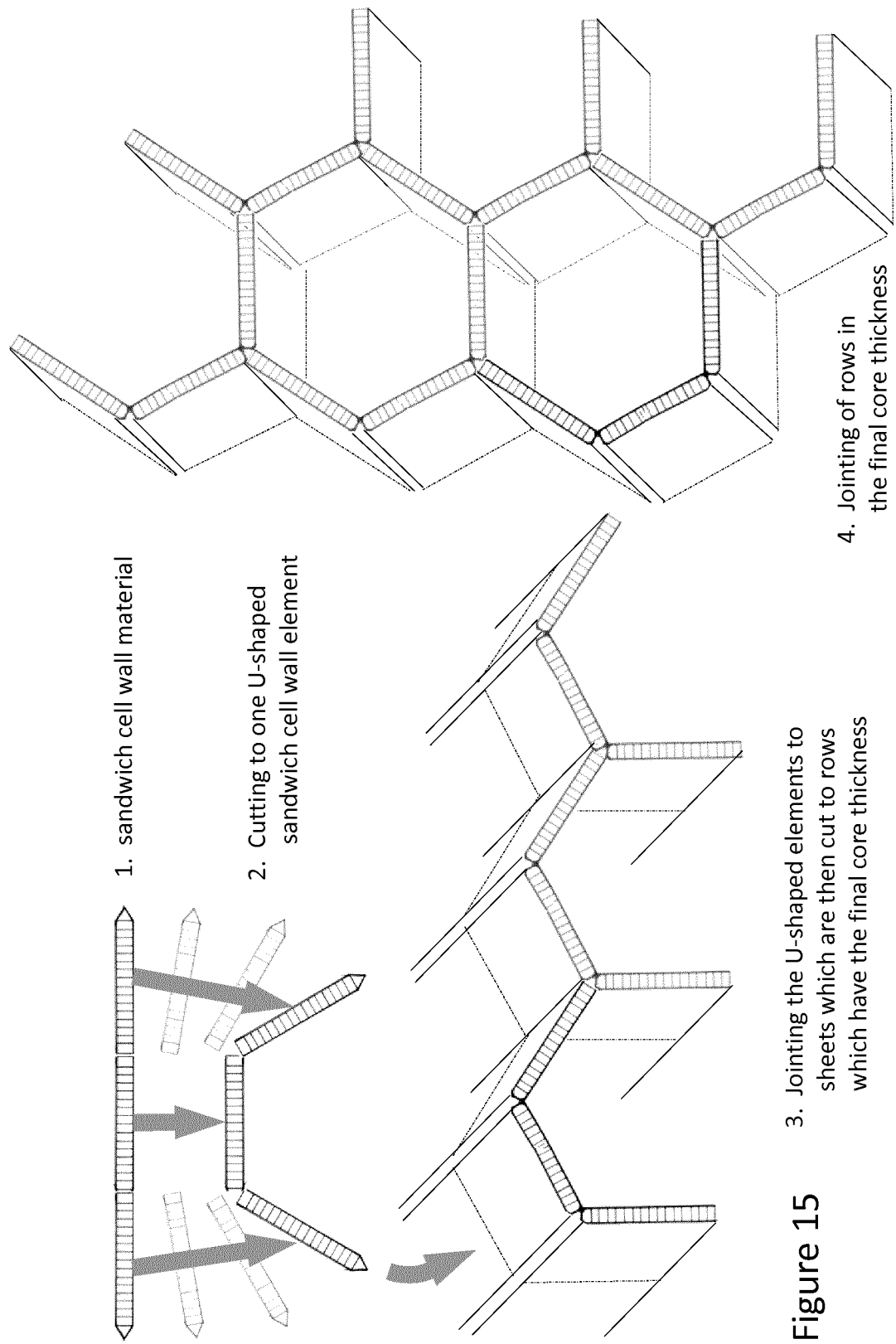
FIGS. 15 and 16 show how a hexagonal honeycomb can be built up from linked sandwich elements according to embodiments of the present invention.

Means for preparing three elements of sandwich material 20 to have sharpened ends including a subtractive machining tool to open up openings 35 leaving the elements joined by a foil (see FIG. 15).

Means to guide the three element piece and arrange it in a U shaped structure.

Means to fuse e.g. mirror weld the U-shaped structure by heating an opening (35) and an end (36) and fuse them together to form a half-honeycomb row (or by means of adhesive).

Use a pick and place robot to bring a half honeycomb row into position with another half honeycomb row and to fuse them e.g. mirror weld them together as shown in FIG. 20 or by means of adhesive.

Repeat process to join one row elements to the rows of half honeycomb cells. As shown in FIG. 9B, these rows are then cut to the desired thickness ($t_C$) and fused, e.g. welded together by a mirror welding equipment (40) as shown in FIG. 9C or FIG. 10B or by means of adhesive.

Furthermore:

In all of the above embodiments, the mesoscopic honeycomb structure of the sandwich layer 20 can have cells with cell walls, the cells having longitudinal axes of the cells of the mesoscopic honeycomb structure which are at right angles to the longitudinal axes of the cells of the macroscopic honeycomb core.

In all of the above embodiments, the skins on the cell walls of the macroscopic honeycomb core and/or cell walls of the mesoscopic honeycomb sandwich materials can be constructed from a thermoplastic foil, a laminate of similar or differing materials, a foil having a fibrous content, a foil made of a polyolefin, polyethylene or polypropylene or polyamine, polycarbonate, polyethylene terephthalate, polyphenylene sulfide, polyethylenimine or other thermoplastic polymers either alone or in mixtures. It is especially advantageous to use for the mesoscopic honeycomb core in the cell walls a thermoformable polymer and in the skins of the cell wall sandwich material a fibre reinforced composite (e.g. based on UD-tapes) from the same thermoplastic polymer, so that the skins to the core can be joint by thermoplastic welding.

In all of the above embodiments, the skins on the cell walls of the macroscopic honeycomb core and/or cell walls of the mesoscopic honeycomb sandwich materials can be constructed from a metal foil, aluminium, steel or titanium or other metals.

In all of the above embodiments the macroscopic honeycomb core can have sandwich cell walls in the form of a hexagon or a rectangle, square or quadrilateral or a triangle. The hexagon or triangular or rectangle, square or quadrilateral is formed of sandwich cells walls having three, four or six connections, respectively, and each connection is a permanently joined connection of both skin layers to both skin layers of at least one neighbouring sandwich cell wall.

The invention claimed is:

1. A hierarchical sandwich core in the form of a macroscopic honeycomb comprising:
    a first macroscopic cell with first sandwich cell walls connected by a connection to neighbouring macroscopic cells with neighbouring sandwich cell walls;
    the first and the neighbouring sandwich cell walls being made of a sandwich material having a width, a mesoscopic core, a first skin layer on a first major surface of said sandwich material and a second skin layer on a second major surface of the sandwich material, both said first and second skin layers being attached to the mesoscopic core forming each said sandwich cell wall of the macroscopic honeycomb;
    the first and the neighbouring sandwich cell walls having a height, the height being defined by the width of the sandwich material, both first and second skin layers of each of the first sandwich cell walls being permanently connected together by a first permanent connection along the height of the first cell walls and both said first and second skin layers of each said neighbouring sandwich cell walls being connected together by a second permanent connection along the height of the neighbouring cell walls;
    the first or the second permanent connections being a fusion bond, or an adhesive bond or a glue bond; and both said first and second skin layers of each of the first sandwich cell walls being connected to both said first and second skin layers of at least one of said neighbouring cell walls along the height of the first cell wall.

2. The hierarchical sandwich core according to claim 1, wherein the first sandwich cell walls and the neighbouring sandwich cell walls are formed with the sandwich material in the form of a multiple arm structure with multiple arms radiating from a centre where ends of the multiple arms are connected together.

3. The hierarchical sandwich core according to claim 2, wherein the multiple arm structure has three, four or six arms.

4. The hierarchical sandwich core according to claim 1, wherein the first macroscopic cell has three, four or six sandwich cell walls and the neighbouring macroscopic cells have three, four or six cell neighbouring sandwich cell walls.

5. The hierarchical sandwich core according to claim 1, wherein the mesoscopic core is a mesoscopic honeycomb or is made of a foam or is made from periodic lattice materials or is made from periodic lattice materials filled with foam or is a corrugated core or is made integrally with both the first and second skin layers of the first sandwich cell wall and both the first and second skin layers of neighbouring sandwich cell walls as an extruded or co-extruded profile or a foam sandwich sheet.

6. The hierarchical sandwich core according to claim 4, wherein a thickness of the sandwich material is smaller than ⅕ of the size of the first macroscopic cell or the neighbouring macroscopic cells.

7. The hierarchical sandwich core according to claim 1, further comprising a chain of at least first and second elements of sandwich material and an opening between the at least first and second elements, the at least first and second elements being joined together by a hinge formed by a foil; and a third element of sandwich material is connected in the opening between the first and second elements to form a three arm structure with three arms radiating and diverging from a centre.

8. The hierarchical sandwich core according to claim 3, wherein rows of connected three arm structures form a macroscopic honeycomb structure.

9. The hierarchical sandwich core according to claim 7, wherein the opening has a first V shape, an end of the third element having a second V shape, the second V shape is connected in the first V shape.

10. The hierarchical sandwich core according claim 9, wherein the mesoscopic core has cells and longitudinal axes of the cells of the mesoscopic core are right angles to longitudinal axes of the first macroscopic and the neighbouring macroscopic cells of the macroscopic honeycomb structure.

11. The hierarchical sandwich core according to claim 1, wherein the mesoscopic core has cells having cell walls of a thermoplastic foil, a foil having a fibrous content, a fibre reinforced polymer composite, or a foil made of a thermoplastic polymer.

12. The hierarchical sandwich core according to claim 1, wherein the mesoscopic core is selected from the group consisting of:
   a corrugated core, and
   a core having the first and second skin layers of the first sandwich cell walls and the neighbouring cell walls being made integrally therewith.

13. The hierarchical sandwich core according to claim 4, wherein the first macroscopic cell and the neighbouring macroscopic cells are in the form of a triangle, a rectangle or a hexagon.

14. The hierarchical sandwich core according to claim 1, wherein the fusion bond is made by welding, brazing, soldering or where a material is melted or fused in creating the first or second connections.

15. The hierarchical sandwich core according to claim 1, wherein the first or the second permanent connection can be a continuous connection or a non-single point discontinuous connection.

16. The hierarchical sandwich core according to claim 1, wherein the mesoscopic core is selected from the group consisting of:
   a corrugated core, and
   a core having the first and second skin layers of the first sandwich cell walls or the neighbouring cell walls being made integrally therewith.

* * * * *